US006972850B2

(12) United States Patent
Ohtsuka et al.

(10) Patent No.: US 6,972,850 B2
(45) Date of Patent: Dec. 6, 2005

(54) METHOD AND APPARATUS FOR MEASURING THE SHAPE OF AN OPTICAL SURFACE USING AN INTERFEROMETER

(75) Inventors: Masaru Ohtsuka, Tokyo (JP); Seiichi Kamiya, Chiba (JP); Hitoshi Iijima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 268 days.

(21) Appl. No.: 10/374,142

(22) Filed: Feb. 27, 2003

(65) Prior Publication Data

US 2003/0169430 A1 Sep. 11, 2003

(30) Foreign Application Priority Data

Mar. 6, 2002 (JP) ............................ 2002-060212
Mar. 12, 2002 (JP) ............................ 2002-066890

(51) Int. Cl.[7] ................................................ G01B 9/02

(52) U.S. Cl. .................................................... 356/515

(58) Field of Search ........................ 356/511, 512, 513, 356/514, 515, 521

(56) References Cited

U.S. PATENT DOCUMENTS

| | | | | |
|---|---|---|---|---|
| 5,076,695 A * | 12/1991 | Ichihara | | 356/513 |
| 5,485,275 A | 1/1996 | Ohtsuka | | |
| 5,548,403 A * | 8/1996 | Sommargren | | 356/513 |
| 5,835,217 A * | 11/1998 | Medecki | | 356/521 |
| 5,991,034 A | 11/1999 | Ohtsuka | | |
| 2001/0028462 A1 | 10/2001 | Ichihara et al. | | |

FOREIGN PATENT DOCUMENTS

| | | |
|---|---|---|
| DE | 199 44 021 | 5/2000 |
| JP | 02-228505 | 9/1990 |
| JP | 2002296005 A | * 10/2002 |

OTHER PUBLICATIONS

R. Arnold Nicolaus, et al., "A Novel Interferometer for Dimensional Measurement of a Silicon Sphere", IEEE Transactions on Instrumentation and Measurement, vol. 46, No. 2, pp. 563-565, (Apr. 1997).

* cited by examiner

*Primary Examiner*—Samuel A. Turner
(74) *Attorney, Agent, or Firm*—Fitzpatrick, Cella, Harper & Scinto

(57) ABSTRACT

There is provided a shape measuring apparatus using an interferometer comprising a lens for condensing temporarily light waves from a light source, and a light wave shaping plate having a pinhole with suitable size adapted to convert the condensed light waves into an ideal spherical wave and a window provided in the vicinity of the pinhole and having enough size to pass therethrough light wave surface information, in which at least one lens having a reference surface and a surface to be measured the optical axes of which are slightly decentered in an optical path of the light waves passed through the pinhole is arranged in a position where the light waves which are made incident perpendicularly to the reference surface to be reflected therefrom pass through the pinhole again, and the light reflected from the surface to be measured pass through the window, and the reflected light reflected by the reference surface to pass through the pinhole again and the reflected light reflected by the surface to be measured to pass through the window are made to interfere with each other to measure a shape of the surface to be measured.

27 Claims, 8 Drawing Sheets

METHOD AND APPARATUS FOR MEASURING THE SHAPE OF AN OPTICAL SURFACE USING AN INTERFEROMETER

BACKGROUND OF THE INVENTION

1. Field of the Invention

The present invention relates to shape measuring method and apparatus using an interferometer for measuring a spherical shape of a demagnification projection optical lens, a mirror or the like for a semiconductor aligner with very high accuracy.

2. Related Background Art

Heretofore, as for a method of measuring a shape of a spherical lens or a mirror with high accuracy, in general, a Fizeau interferometer, a Twyman-Green interferometer or the like is used. However, in either case, a spherical surface and a flat surface for reference are required, and hence the absolute accuracy is regularized by the shape accuracy of the reference spherical surface and the reference flat surface. In general, as for the surface accuracy of the reference surface, it is postulated that, assuming that the He-Ne laser wavelength is $\lambda(\lambda=632.8$ nm), it is a limit to ensure about $\lambda/10$ to about $\lambda/20$.

On the other hand, along with the scale down (shrink) and the high accuracy of a semiconductor aligner, the wavelength of the exposure light source has been shortened from the KrF excimer laser ($\lambda=248$ nm) to the F2 laser ($\lambda=157$ nm) through the ArF excimer laser ($\lambda=193$ nm). Furthermore, even the EUV (Extreme Ultra Violet) light ($\lambda=13.6$ nm) has been used as the exposure light source. The shape accuracy of 1 nm to 0.1 nm is required for the projection optical lens and the mirror for the aligner, and hence for attaining such accuracy, a measurement apparatus of higher accuracy is required. Normally, for the measurement of such accuracy, it is difficult to simply realize even the reproducibility, and much more it is very difficult to ensure the absolute accuracy.

The technique in which the absolute accuracy of an optical surface of equal to or smaller than 10 Å is ensured is described in Japanese Patent Application Laid-Open No. 2-228505. The construction of a first prior art described as a first embodiment in the document is shown in FIG. 10. In FIG. 10, light waves emitted from a light source 1 are condensed by a condensing lens 2 to reach a pinhole mirror 3. A part of the light waves passes through a pinhole formed in the pinhole mirror 3 to strike an object 4 to be measured to be returned back to the pinhole mirror 3 again. Then, they are reflected by the surface of the pinhole mirror 3 this time to reach an image pickup device 7. These light waves are called the measurement light. The light waves other than the measurement light are reflected by the pinhole mirror 3 to be reflected by a condenser mirror 5 to be returned back to the pinhole mirror 3 again. Then, they pass through the pinhole this time to reach the image pickup device 7. These light waves are called the reference light. Since the measurement light and the reference light interfere with each other to form the interference fringes, the surface shape of an object to be measured is measured by capturing these interference fringes with the image pickup device 7.

It is known that the light waves pass through a pinhole to become the diffracted ideal spherical waves. Thus, since the measurement light becomes the diffracted ideal spherical waves at a time point when passing through a pinhole, the light waves reflected by the object 4 to be measured become the light waves which have, as the aberration information, only the shape error from the spherical surface of the object 4 to be measured. The light waves reach as the measurement light the image pickup device 7. The reference light, after having been reflected and condensed by the condenser mirror 5, passes through the pinhole to become the diffracted ideal spherical waves. For this reason, the light waves having no aberration reach the image pickup device 7. At this time, the surface accuracy of the condenser mirror 5 does not need to meet especially the high accuracy, and hence is sufficient as long as the condenser mirror 5 has the accuracy of reflecting the light waves. In such a manner, the measurement light and the reference light can form the interference fringes having purely only the shape error information of the object 4 to be measured on the image pickup device 7, and hence the shape measurement can be carried out with high accuracy without providing a special reference surface.

In addition, the construction of a second prior art described as a second embodiment in Japanese Patent Application Laid-Open No. 2-228505 is shown in FIG. 11. In FIG. 11, the light waves emitted from the light source 1 are made pass through a pinhole provided in the pinhole mirror 3 through the condensing lens 2 to become the diffracted ideal spherical waves, and a part of them is made incident as the reference light to the image pickup device 7. In addition, after another part of these light waves has been reflected by the object 4 to be measured, it is reflected by the pinhole mirror 3 to be made incident to the image pickup device 7 to become the measurement light. The surface shape of the object to be measured is measured by capturing the interference fringes generated by the interference between the reference light and the measurement light with the image pickup device 7. The second prior art adopts the construction in which the condenser mirror of the first prior art is omitted.

However, since in the first prior art described as the first embodiment in Japanese Patent Application Laid-Open No. 2-228505 is shown in FIG. 10, the reference optical axis and the optical axis to be measured are separated from each other with a large angle of 90 degrees, the apparatus becomes large and complicated. In addition, since the distance from the pinhole to the surface to be measured is necessarily set to the distance for the radius of curvature of the surface to be measured, when the surface to be measured having a large radius of curvature is measured, the optical path becomes long and hence reduction in accuracy due to air fluctuation is not avoided. In addition, while if the surface to be measured is a concave surface, then the measurement is possible, in the case of a convex surface, the measurement is impossible. Also, since a mirror is necessarily required for the pinhole portion, there is a possibility that contamination or the fine irregularity of the mirror may exert an influence on the wavefront to be measured.

Moreover, in the second prior art described as the second embodiment in Japanese Patent Application Laid-Open No. 2-228505 shown in FIG. 11, in addition to the above-mentioned problem, the light waves which can be used as the measurement light become a part of the divergence of the ideal spherical waves passed through the pinhole, and hence a quantity of light becomes less, which results in the reduction of the measurement accuracy. Also, since an area in which an object to be measured is arranged is limited, it is impossible to measure an object to be measured having a large surface to be measured.

SUMMARY OF THE INVENTION

In the light of the foregoing, the present invention has been made in order to solve the above-mentioned problems associated with the prior art, and it is therefore an object of the present invention to provide shape measuring method and apparatus using a Fizeau interferometer for measuring a shape of a surface to be measured of a lens with high accuracy. The method and apparatus are capable of sufficiently using luminous fluxes diverging from a pinhole and of having no limit to an area having an object to be measured arranged therein, without increasing a scale of the measurement apparatus and contaminating a light wave shaping plate having a pinhole on the basis of making ideal diffracted spherical waves passed through a pinhole the reference light.

It is another object of the present invention to provide shape measuring method and apparatus, each using an interrferometer, which are capable of measuring readily a convex-type optical surface for which normally, it is postulated that the measurement thereof is difficult.

It is still another object of the present invention to provide shape measuring method and apparatus, each using an interferometer, which are capable of measuring a shape of an optical surface of a divergence-type TS lens arranged next to a surface to be measured of a lens with high accuracy by making the surface to be measured of the lens measured with the above-mentioned shape measuring method and apparatus the reference surface this time.

It is yet another object of the present invention to provide shape measuring method and apparatus using an interferometer which are capable of measuring, with the optical surface measured with the above-mentioned divergence-type TS lens as the reference surface, an optical surface of a lens arranged next thereto.

It is a further object of the present invention to provide shape measuring method and apparatus, each using an interferometer, which are capable of measuring an absolute shape with very high accuracy without being influenced by the refractive index distribution of a lens member.

In order to attain the above-mentioned objects, according to the present invention, there are provided a shape measuring apparatus and a shape measuring method, comprising:

a light source;

a condensing lens for condensing temporarily light waves from the light source;

a light wave shaping plate in which a pinhole adapted to convert the condensed light waves into an ideal spherical wave and a window provided in the vicinity of the pinhole and adapted to pass therethrough the light wave surface information are formed;

in which at least one lens having a reference surface and a surface to be measured, the optical axes of which are decentered from each other, is arranged in the position where the light waves reflected by the reference surface pass through the pinhole again and the light waves reflected by the measurement surface pass through the window; and the reflected light reflected by the reference surface to pass through the pinhole again and the reflected light reflected by the surface to be measured to pass through the window are made to interfere with each other to thereby measure a shape of the surface to be measured.

Further, according to the present invention, there are provided a shape measuring apparatus and a shape measuring method using an interferometer in which the lens is a single lens having concave-type and convex-type optical surfaces the curvature centers of which are slightly different from each other in the vicinity of the pinhole.

Further, according to the present invention, there are provided a shape measuring apparatus and a shape measuring method using an interferometer in which the surface to be measured is a concave-type type optical surface of the lens nearest the pinhole, and the reference surface is a convex-type optical surface facing the concave-type optical surface.

Further, according to the present invention, there are provided a shape measuring apparatus and a shape measuring method using an interferometer in which the surface to be measured is a concave-type optical surface nearest the pinhole of the lens nearest the pinhole, and the reference surface is an optical surface of the lens different from the lens nearest the pinhole.

Further, according to the present invention, there are provided a shape measuring apparatus and a shape measuring method using an interferometer in which the surface to be measured is a concave type optical surface nearest the pinhole of the lens nearest the pinhole, and the reference surface is an optical surface of the lens different from the lens nearest the pinhole.

Further, according to the present invention, there are provided a shape measuring apparatus and a shape measuring method using an interferometer, the apparatus comprising:

a light source;

a condensing lens for condensing temporarily light waves from the light source;

a light wave shaping plate in which a pinhole adapted to convert the condensed light waves into an ideal spherical wave and a window provided in the vicinity of the pinhole and adapted to pass therethrough light wave surface information are formed; and a mirror member having an optical reflecting surface for reflecting the light waves passing through the pinhole, and the method comprising:

adjusting at least one lens having a surface to be measured an optical axis of which is decentered from an optical axis of another optical surface at a position where the light waves reflected by the surface to be measured pass through the window between the pinhole and the mirror member;

arranging the mirror member at a position where the light waves are made incident perpendicularly to the optical reflecting surface and the reflected light waves pass through the pinhole again; and measuring a shape of the surface to be measured by making the reflected light reflected by the optical reflecting surface to pass through the pinhole again and the reflected light reflected by the surface to be measured to pass through the window interfere with each other.

Further, according to the present invention, there is provided a shape measuring method using an interferometer in which after the surface to be measured is measured in accordance with the shape measuring method, the light wave shaping plate is removed, and the reflected light from the surface to be measured and the reflected light from the reference surface are made to interfere with each other to measure a shape of the reference surface.

Further, according to the present invention, there is provided a shape measuring method using an interferometer in which the optical surface of the lens opposite to the light source is a convex-type optical surface, and in which the method comprises:

after the convex-type optical surface is measured in accordance with the shape measuring method, removing the light wave shaping plate;

arranging an optical element having a second surface to be measured on the side of the lens opposite to the light source; and making the reflected light from the second surface to be measured and the reflected light from the convex-type optical surface interfere with each other to measure a shape of the second surface to be measured.

Further, according to the present invention, there is provided a shape measuring method using an interferometer in which the second surface to be measured is a concave-type optical surface.

According to the present invention, there is provided a shape measuring method using an interferometer, further comprising:

after the surface to be measured is measured in accordance with the shape measuring method, removing the light wave shaping plate and the condensing lens;

arranging a divergence-type TS lens between the light source and the lens; and making the reflected light from the surface to be measured and the reflected light from a reference surface of the divergence-type TS lens interfere with each other to measure a shape of the reference surface of the divergence-type TS lens.

According to the present invention, there is provided a shape measuring method using an interferometer, further comprising:

after the reference surface of the divergence-type TS lens is measured in accordance with the shape measuring method, removing the lens;

arranging a lens having a third surface to be measured in a position where the lens is removed; and making the reflected light from the reference surface of the divergence-type TS lens and the reflected light from the third surface to be measured interfere with each other to measure a shape of the third surface to be measured.

Further, according to the present invention, there are provided a shape measuring apparatus and a shape measuring method using an interferometer for measuring a shape of a surface to be measured of a lens having an optical surface becoming a reference surface and an optical surface becoming the surface to be measured, the apparatus comprising:

measurement unit for making light incident from one direction of an optical axis of the surface to be measured to make the reflected light from the reference surface and the reflected light from the surface to be measured interfere with each other to measure a shape of the surface to be measured;

measurement unit for making light incident from an opposite direction of an optical axis of the surface to be measured to make the reflected light from the reference surface and the reflected light from the surface to be measured interfere with each other to measure a shape of the surface to be measured; and arithmetic operation unit for arithmetically operating the shape of the surface to be measured on the basis of the two measurement results.

Further, according to the present invention, there are provided a shape measuring apparatus and a shape measuring method using an interferometer, in which the shape measuring apparatus further comprises a reversal unit for reversing the lens, and in which the two measurement units for measuring the shape of the surface to be measured are achieved using a unit for measuring the same shape.

Further, according to the present invention, there are provided a shape measuring apparatus and a shape measuring method using an interferometer, in which the two measurement units for measuring the surface to be measured include the interferometers arranged opposite to each other at both sides of the lens.

Further, according to the present invention, there is provided a shape measuring apparatus using an interferometer, in which the two measurement units for measuring the surface to be measured include units for measuring the same shape and the light incident on the surface to be measured is optically divided into two lights which are incident on the surface to be measured from both the sides thereof.

Further, according to the present invention, there is provided a shape measuring apparatus using an interferometer in which the lens is a lens group constructed of a plurality of lenses.

Further, according to the present invention, there is provided a shape measuring method using an interferometer that uses a measurement unit comprising: a light source; a condensing lens for temporarily condensing light from the light source; and a light wave shaping plate in which a pinhole adapted to convert the condensed light into an ideal spherical wave and a window provided in the vicinity of the pinhole and adapted to pass therethrough light wave surface information are formed, with a reference surface and a surface to be measured having optical axes which are decentered from each other, the method further comprising:

arranging the lens in an optical path of a light passing through the pinhole at a position where the light reflected by the reference surface passes through the pinhole again and the light reflected by the surface to be measured passes through the window; and previously measuring a shape of the reference surface and then removing the light wave shaping plate, and measuring the surface to be measured through the measurement unit by making the reflected light reflected by the reference surface to pass through the pinhole again and the light reflected by the surface to be measured to pass through the window interfere with each other.

According to the present invention, there is provided a shape measuring method using an interferometer, further comprising: arranging an optical element having a second surface to be measured that is opposite to the surface to be measured after measuring the surface to be measured by the shape measuring method; and measuring a shape of the second surface to be measured through the measurement unit by making a reflected light from the second surface to be measured and the reflected light from the surface to be measured interfere with each other.

The above and other objects, features, and advantages of the invention will become more apparent from the following detailed description taken in conjunction with the accompanying drawings.

DESCRIPTION OF THE PREFERRED EMBODIMENTS

The preferred embodiments of the present invention will hereinafter be described in detail with reference to the accompanying drawings.

(First Embodiment)

Figure 1:
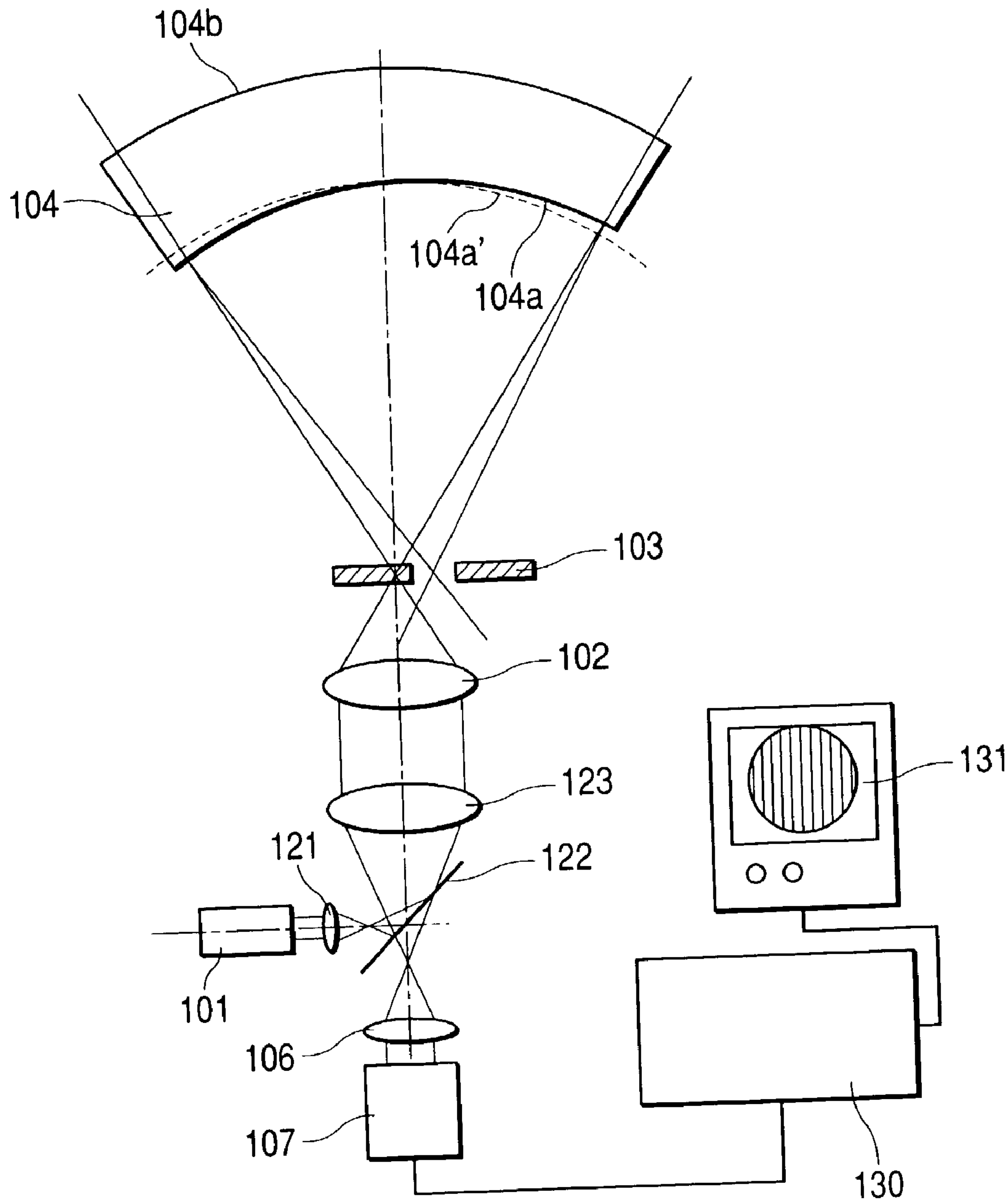
FIG. 1 is a view useful in explaining a first embodiment of the present invention.
Figure 2A:
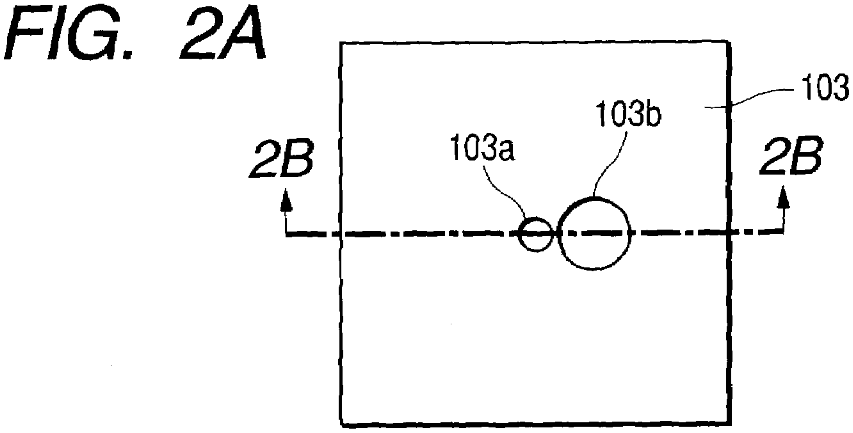
FIGS. 2A and 2B are views useful in explaining in detail a pinhole portion used in the first embodiment.
Figure 2B:

A first embodiment of the present invention is shown in FIG. 1. In FIG. 1, reference numeral 101 designates a laser as a light source. Reference numeral 121 designates a condensing lens for condensing temporarily laser beams emitted from the light source 101 to diverge the condensed beams, and reference numeral 122 designates a beam splitter with a polarizing film for changing the travelling direction of the laser beams in accordance with its polarization azimuth. Reference numeral 123 designates a collimator lens for converting temporarily the laser beams into parallel beams, and reference numeral 102 designates a condensing lens for condensing the parallel beams to a pinhole. Reference numeral 103 designates a light wave shaping plate having a pinhole 103*a* with a diameter of about a wavelength of the laser beams to be used, and a window 103*b* provided several μm to several hundreds μm apart from the pinhole 103*a* and adjacent thereto. Reference numeral 104 designates a lens having a concave-type optical surface 104*a* and a convex-type optical surface 104*b*. Also, reference numeral 106 designates an imaging lens for imaging interference fringes on a camera, reference numeral 107 designates a CCD camera as an image pickup device, reference numeral 130 designates a computer for processing electronic image data, and reference numeral 131 designates a display device for displaying thereon a measured image or a processed image. In this example, the optical surface 104*a* is made a surface to be measured, and the optical surface 104*b* is made a reference surface. FIGS. 2A and 2B are detailed views of the light wave shaping plate 103. FIG. 2A shows a plan view showing a situation in which the pinhole 103*a* and the window 103*b* are provided adjacent to each other. FIG. 2B shows a cross sectional view taken along the line 2B—2B of FIG. 2A.

The laser beams emitted from the light source 101 are temporarily condensed by the condensing lens 121 to be diverged and then its travelling direction is folded by the operation of the polarizing beam splitter 122. Then, after these laser beams have been converted into the parallel light beams by the collimator lens 123, they are condensed by the condensing lens 102 to pass through the pinhole 103*a* formed in the light wave shaping plate 103. It is proved from the diffraction theory that when the wavelength of the laser beams of the used light source is λ, and the numerical aperture of the condensing lens 102 is NA, if the diameter Φd of this pinhole is set so as to meet the relationship of $\lambda/2<\Phi d<\lambda/NA$, then even when the incident wave surface has the aberration, the light waves pass through the pinhole to thereby be converted into the ideal spherical waves having no aberration. When for example, the wavelength λ of the laser beams of the used light source is 0.6 μm, and the numerical aperture NA of the condensing lens 102 is 0.5, the diameter Φd of the pinhole 103*a* has to be set so as to meet the relationship of 0.3 μm<Φd<1.2 μm.

A surface designated with reference numeral 104'*a* indicated by a broken line in FIG. 1 is a virtual optical surface which has the same curvature center as that of the optical surface 104*b* and the optical axis aligned with that of the optical surface 104*b*. While FIG. 1 is exaggeratingly drawn to some extent, the virtual optical surface 104*a*' is slightly decentered with respect to the optical surface 104*a* of the lens 104. Thus, the curvature center of the optical surface 104*a* is slightly deviated from the curvature center 103*a* of the optical surface 104*b* in the vicinity thereof.

The lens 104 is arranged in the optical path of the light waves passed through the pinhole 103*a*. The light to be made incident to the optical surface 104*b* is made incident perpendicularly to the optical surface 104*b*, and the reflected light traces accurately the same path to pass through the pinhole 103*a* again. On the other hand, while the light waves passed through the pinhole 103*a* are reflected by the optical surface 104*a* too, since the optical surface 104*a* is decentered with respect to the optical surface 104*b*, the reflected light is not returned back to the pinhole 103*a*, but passes through the window 103*b* provided adjacent to the pinhole 103*a*. However, with respect to the light wave shaping plate 103, both the pinhole 103*a* and the window 103*b* are previously designed so as to correspond to the shape of the lens 104 so that the light reflected by the optical surface 104*a* accurately passes through the window 103*b*. In other words, the positions of the pinhole 103*a* and the window 103*b* of the light wave shaping plate 103 are determined on the basis of the radius of curvature of the optical surface 104*a*, and a quantity of decentering of the optical axis of the optical surface 104*b* with respect to the optical axis of the optical surface 104*a*.

A quantity of decentering has to be the quantity with which the light reflected by the optical surface 104*a* and the light reflected by the optical surface 104*b* form the interference fringes. If, for example, the radius of curvature of the optical surface 104*a* is 100 mm, and a quantity of decentering of the optical axis of the optical surface 104*a* with respect to the optical axis of the optical surface 104*b* is $1\times10^{-4}$ rad, then the distance between the pinhole 103*a* and the window 103*b* has to be set to about 20 μm. In addition, the window 103*b* has to be of the size adapted to allow the light wave surface information of the reflected light from the optical surface 104*b* to pass therethrough, and thus if normally, it is set equal to or larger than 10 μm, then there is no problem.

The reflected light passed through the window 103*b* interferes with the reflected light passed through the pinhole 103*a*, and the resultant light waves pass in the form of the interference fringes through the condensing lens 102 and the collimator lens 123 and then travel straight through the beam splitter 122 this time to be captured with the CCD camera 107 serving as the image pickup device through the imaging lens 106. Then, the electronic image data is analyzed by the computer 130.

The interference fringes obtained at this time interfere with the measurement light having only the shape error information of the optical surface 104*a* with the ideal diffracted spherical waves reflected by the optical surface 104*b* to pass through the pinhole 103*a* as the reference light. In addition, since the optical path of the optical system from the pinhole 103*a* to the CCD camera 107 is the common optical path, the absolute shape of the optical surface 104*a* can be measured with high accuracy.

With the construction described above, it is possible to adopt the construction of the Frizeau interferometer in which the reference optical axis is nearly aligned with the measurement optical axis, and hence it becomes possible to miniaturize the apparatus. In addition, since a mirror member is unnecessary for a pinhole portion, the contamination and the fine irregularity of the mirror exert no influence on the measurement. Moreover, since the whole divergent luminous fluxes from the pinhole can be used as the measurement light, the measurement is prevented from becoming unstable due to insufficiency in a quantity of light, and hence the accurate shape measurement can be surely carried out. Also, since there is no limit to the area in which an object to be measured is arranged, even a large object to be measured can be measured. By the way, since the optical surface 104*b* and the optical surface 104*a* are slightly decentered from each other, the light made incident to the optical surface 104*b* is slightly refracted at the optical surface 104*a*. However, this slight refraction can be disregarded since a quantity of decentering is small.

In addition, normally, in the highly accurate interferometer, for the purpose of detecting the interference fringe phase, there is utilized a so-called fringe scanning method in which the reference surface is moved by about $\lambda/2$ with a piezo device to carry out the fringe scanning. However, since in the present embodiment, both the reference surface and the surface to be measured are present on the same member, it is impossible to implement the fringe scanning method. However, the wavelength scanning method or the spatial modulation method utilizing the tilt fringes as other fringe scanning unit is utilized, whereby it is possible to readily detect the interference fringe phase. When the wavelength scanning method is utilized, a light source such as a semiconductor laser which can carry out the wavelength scanning has to be used as the light source 1, while in the case of the spatial modulation method, the computer 130 has to be loaded with the function of analyzing the same.

In this connection, while in the present embodiment, the optical surface 104*a* is made the surface to be measured, and the optical surface 104*b* is made the reference surface, alternatively, it is also possible that the optical surface 104*a* is made the reference surface and the optical surface 104*b* is made the surface to be measured. In this case, the light to be made incident to the optical surface 104*a* is made incident perpendicularly to the optical surface 104*a*, and the reflected light traces accurately the same path to pass through the pinhole 103*a* again. On the other hand, the light reflected from the optical surface 104*b* is not returned back to the pinhole 103*a* since the optical surface 104*a* is decentered from the optical surface 104*a*, but passes through the window 103*b* provided adjacent to the pinhole 103*a*. By adopting such construction, the convex-type optical surface 104*b*, for which it is normally postulated that the measurement thereof is difficult, can be readily measured. In the case where the optical surface 104*b* is made the surface to be measured, the light waves made incident or reflected to or from the optical surface 104*b* suffer the influence of the quality of the material of the lens since they pass through the inside of the lens 104. Consequently, it is desirable that the surface to be measured is the optical surface nearest the pinhole 103*a* of the lens 104. However, even in the case where the optical surface 104*b* is made the surface to be measured, since the influence due to the refractive index distribution or the like of the material of the lens 104 can be readily grasped, if the value therefor is corrected, then the absolute shape of the optical surface 104*b* can be measured with high accuracy.

In addition, it is also possible that in the shape measuring method in the present embodiment described above, the shape of the optical surface 104*b* is measured using the optical surface 104*a* the absolute accuracy of which is already measured. The light wave shaping plate 103 is previously made enterable and exitable into and from the light waves used for measurement. Then, after the optical surface 104*a* has been measured by utilizing the above-mentioned measurement method, the wave surface shaping plate 103 is removed, whereby it is possible to construct the Fizeau interferometer in which the optical surface 104*a* is made the reference surface and the optical surface 104*b* is made the surface to be measured. Consequently, with the measurement method using the normal Fizeau interferometer already known, the optical surface 104*b* can be measured with the measured optical surface 104*a* as the reference surface. If such a measurement method is utilized, then both the optical surfaces 104*a* and 104*b* of the lens 104 can be measured with high accuracy.

(Second Embodiment)

Figure 3:
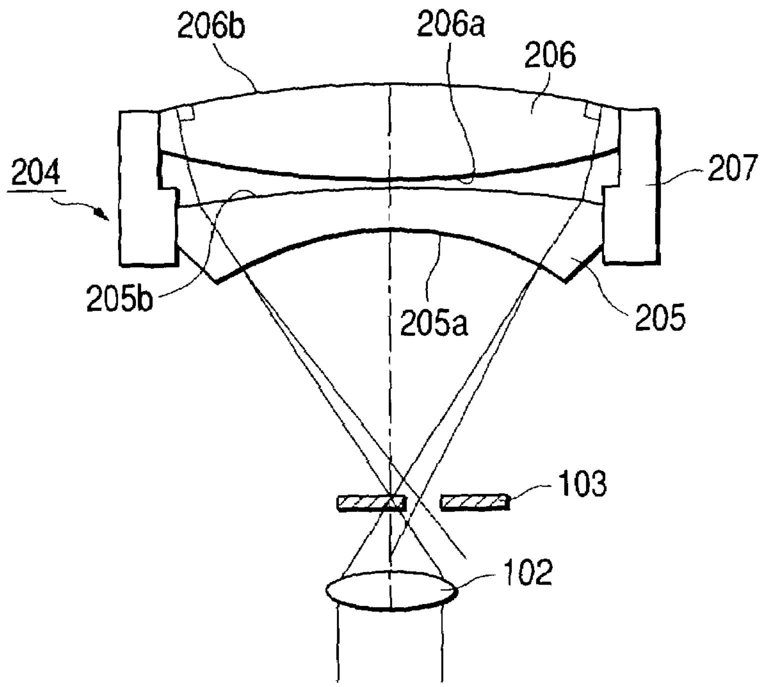
FIG. 3 is a view useful in explaining a second embodiment of the present invention.

FIG. 3 is a view for explaining a second embodiment of the present invention. Since the laser 101, the lens 121, the beam splitter 122, the collimator lens 123, the imaging lens 106, the CCD lens 107, the computer 130, and the display device 131 are the same as those in the first embodiment, those constituent elements are not illustrated in FIG. 3, and only the constituent elements different from the first embodiment are illustrated. In the second embodiment, the same constituent elements as those of the first embodiment are designated with the same reference numerals.

Similarly to FIG. 1, reference numeral 102 designates the condensing lens, and reference numeral 103 designates the light wave shaping plate. Reference numeral 204 designates a lens group formed of a plurality of lenses 205 and 206. Reference numeral 207 designates a chassis for holding therein the lenses 205 and 206. The lens 205 has a concave-type optical surface 205*a* and a convex-type optical surface 205*b*. In addition, the lens 206 has convex-type optical surfaces 206*a* and 206*b*. The optical surfaces are arranged in the order of the optical surfaces 205*a*, 205*b*, 206*a* and 206*b* from the condensing lens 102 side. In the present embodiment, the optical surface 205*a* is the surface to be measured, and the optical surface 206*b* is the reference surface.

The lens group 204 are arranged in the optical path of the light waves passed through the pinhole 103*a*. The lens 205 and the lens 206 are fixedly held in the chassis 207 in a state in which the optical axis of the optical surface 205*a* and the optical axis of the optical surface 206*a* are adjusted so as to be slightly decentered from each other. The light waves to be made incident to the optical surface 206*b* is made incident perpendicularly to the optical surface 206*b*, and the reflected light waves trace accurately the same path to pass through the pinhole 103*a* again. On the other hand, the light waves passed through the pinhole 103*a* are reflected by the optical surface 205*a* as well. However, they are not returned back to the pinhole 103*a* since the optical surface 205*a* is decentered from the optical surface 206*b*, but pass through the window 103*b* which is provided adjacent to the pinhole 103*a*. However, with respect to the wave surface shaping plate 103, the positions of the pinhole 103*a* and the window 103*b* are previously designed so as to correspond to the shape of the lens group 204 so that the light reflected from the optical surface 205*a* passes accurately through the window 103*b*. In other words, the positions of the pinhole 103*a* and the window 103*b* of the light wave shaping plate 103 are determined on the basis of a radius of curvature of the optical surface 205*a* and a quantity of decentering of the optical axis of the optical surface 205*a* with respect to the optical axis of the optical surface 206*b*. By adopting such construction, the shape of the optical surface 205*a* can be measured by utilizing the same method as that of the first embodiment.

By the way, while in the present embodiment, the optical surface 205*a* is made the surface to be measured and the optical surface 206*b* is made the reference surface, alternatively, it is also possible that the optical surface 205*a* is made the reference surface and the optical surface 206*b* is made the surface to be measured. In this case, the light to be made incident to the optical surface 205*a* is made incident perpendicularly to the optical surface 205*a*, and the reflected light traces accurately the same path to pass through the pinhole 103*a* again. On the other hand, the light reflected by the optical surface 206*b* is not returned back to the pinhole 103*a* since the optical surface 206*b* is decentered from the optical surface 205*a*, but passes through the window 103*b* which is provided adjacent to the pinhole 103*a*. In addition, likewise, it is also possible that the optical surfaces 205*b* and 206*a* are made the surface to be measured and the reference surface, respectively, or vice versa.

However, when the optical surface 205*b* or 206*a* is made the surface to be measured, the light made incident or reflected to or from the optical surface 205*b* or 206*a* suffers the influence of the quality of the material of the lens 205 since it passes through the inside of the lens 205. In addition, likewise, when the optical surface 206*b* is made the surface to be measured, the light made incident or reflected to or from the optical surface 206*b* suffers the influence of the quality of the materials of the lenses 205 and 206 since it passes through the insides of the lenses 205 and 206. Consequently, it is desirable that the surface to be measured is the optical surface 205*a* nearest the pinhole 103*a* of the lens 205 of the lens group 204 nearest the pinhole 103*a*. However, even in the case where the optical surface 205*b*, 206*a* or 206*b* is made the surface to be measured, if the refractive index distributions or the like of materials of the lenses 205 and 206 are taken into consideration to correct the value therefor, then the absolute shape can be measured with high accuracy.

In addition, in the case where the optical surface 206*b* is neither the surface to be measured nor the reference surface, there must be applied a film adapted to reduce reflectivity so that the light is not reflected by the optical surface 206*b*. Moreover, likewise, in the case where both the optical surfaces 206*a* and 206*b* are neither the surface to be measured nor the reference surface, there must be applied a film adapted to reduce reflectivity so that the light is not reflected by the optical surfaces 206*a* and 206*b*. Consequently, it is desirable that the reference surface is the optical surface 206*b* farthest from the pinhole 103*a* of the optical surfaces of the lens 206 farthest from the pinhole 103*a*.

In accordance with the present embodiment, in addition to the effects obtained in the above-mentioned first embodiment, there is offered the effect that even when the curvature center of the surface 205*a* to be measured is made completely different from that of the reference surface 206*b* by the optical design of the lens group 204, it is possible to measure the optical surface concerned. For this reason, the variation of the lens becoming an object of the measurement is greatly increased, and hence even the optical surface having a large radius of curvature, and the convex-type optical surface as well as the concave-type optical surface can be measured irrespective of the shape of the lens to be measured. In addition, even the convex-type or concave-type optical surface having a large radius of curvature can be measured at the distance near the pinhole 203*a*, which results in that it is possible to miniaturize the apparatus and also it is possible to prevent the reduction in the measurement accuracy due to the air fluctuation.

Moreover, in accordance with the present embodiment, similarly to the first embodiment, it is also possible that after the optical surface 205*a* has been measured by utilizing the above-mentioned measurement method, the light wave shaping plate 103 is removed to construct the Fizeau interferometer in which the optical surface 205*a* is made the reference surface and the optical surface 206*b* is made the surface to be measured to thereby measure the optical surface 206*b*. In this case, even when the optical surface 206*b* is a convex or concave-type surface having a large radius of curvature, or a flat surface by the design of the lens group 204, it is possible to perform measurement thereof. Also, likewise, it is also possible to measure the optical surfaces 205*b* and 206*a*.

(Third Embodiment)

Figure 4A:
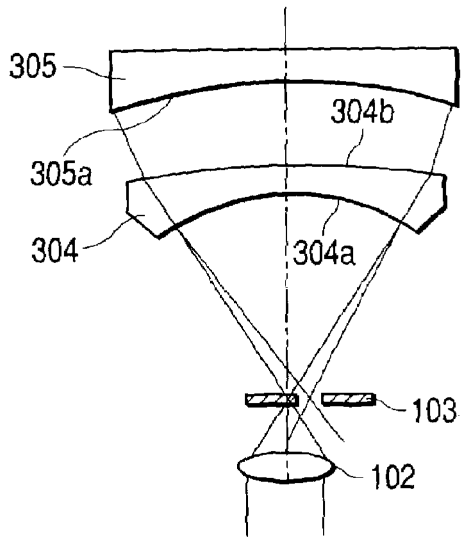
FIGS. 4A and 4B are views useful in explaining a third embodiment of the present invention.
Figure 4B:
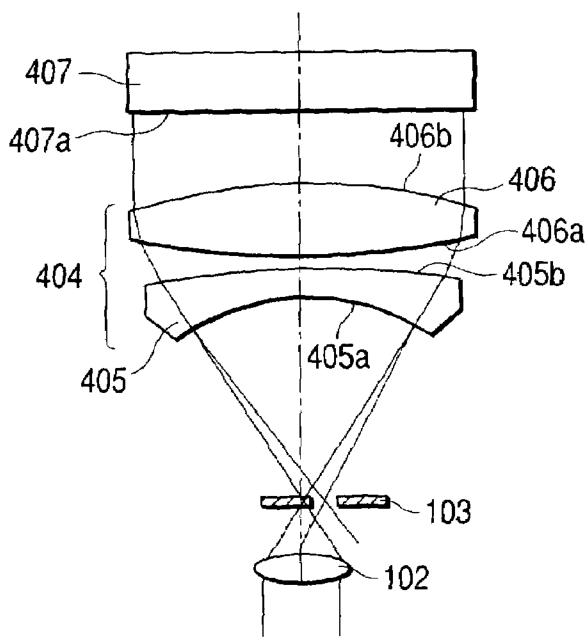

FIGS. 4A and 4B are views for explaining a third embodiment of the present invention. Since the laser 101, the lens 121, the beam splitter 122, the collimator lens 123, the imaging lens 106, the CCD lens 107, the computer 130, and the display device 131 are the same as those in the first embodiment, these constituent elements are not illustrated in FIGS. 4A and 4B, and only the constituent elements different from the first embodiment are illustrated. In the present embodiment, the same constituent elements as those of the first embodiment are designated with the same reference numerals.

First of all, FIG. 4A is a view for explaining the case where the lens to be measured is a single lens. Similarly to FIG. 1, reference numeral 102 designates the condensing lens, and reference numeral 103 designates the light wave shaping plate. In the present embodiment, a mirror member 305 having a concave type optical surface 305*a* becoming the reference surface is previously arranged on the optical path of the light passed through the pinhole 103*a*. Reference numeral 304 designates a lens having a concave-type optical surface 304*a* and a convex-type optical surface 304*b*, and the optical surface 304*a* becomes the surface to be measured.

The lens 304 is arranged in the optical path of the light waves passed through the pinhole 103*a* so that the optical axis of the optical surface 304*a* of the lens 304 is slightly decentered from the optical axis of the optical reflecting surface 305*a* of the mirror member 305. The light waves passed through the pinhole 103*a* are reflected by the optical surface 304*a*. However, they are not returned back to the pinhole 103*a* since the optical surface 304*a* is slightly decentered from the optical axis, but passes through the window 103*b* provided adjacent to the pinhole 103*a*. On the other hand, the light to be made incident to the optical reflecting surface 305*a* is made incident perpendicularly to the optical reflecting surface 305*a* by adjusting the position of the optical reflecting surface 305*a*, and the reflected light waves trace accurately the same path to pass the pinhole 103*a* again.

Next, FIG. 4B is a view for explaining the case where the lens for measurement is a lens group formed of a plurality of lenses. A lens group 404 in the present embodiment includes a lens 405 having a concave-type optical surface 405*a* and a convex-type optical surface 405*b*, and a lens 406 having convex-type optical surfaces 406*a* and 406*b*. In the present embodiment, the optical surface 405*a* nearest the pinhole 103*a* of the lens 405 nearest the pinhole 103*a* is the surface to be measured. Reference numeral 407 designates a mirror member having an optical reflecting surface 407a which is previously arranged on the optical path of the light passed through the pinhole.

The lens 404 is arranged in the optical path of the light waves passed through the pinhole 103a so that the optical axis of the optical surface 405a of the lens 405 is slightly decentered from the optical axis of the optical reflecting surface 407a of the mirror member 407. Under this state, the shape of the optical surface 405a is measured by utilizing the same method as that in the case of the single lens shown in FIG. 4A. In addition, in the case of FIG. 4B, since refractive index of the light can be readily adjusted from the design of the lens group 404, the mirror member 407 can also be made a plate mirror in which the optical reflecting surface 407a is a flat surface.

With such construction, the shapes of the optical surfaces 305a and 405a can be measured by utilizing the same method as that in the first embodiment. In accordance with the present embodiment, in addition to the effects obtained in the above-mentioned first embodiment, there is offered the effect that there is no need for adjusting previously the positions of the pinhole and the window of the light wave shaping plate on the basis of the radius of curvature of the surface to be measured and a quantity of decentering with respect to the optical axis, and it is possible to cope therewith by adjusting the position of the mirror member 305. Consequently, the design of the lens or lens group becoming an object to be measured does not need to meet a certain measurable condition, and hence the variation of the measurable lens is increased to enhance greatly the wide application of the measurement apparatus.

In addition, since in the present embodiment, the lens 304 and the lens group 404 are constructed in a style separate from the mirror member 407, the minute decentering which is necessary in the first and second embodiments and given to two surfaces of the surface to be measured and the reference surface can be readily given by the mechanical adjustment (not shown) of tilting slightly the mirror members 305 and 407.

(Fourth Embodiment)

Figure 5:
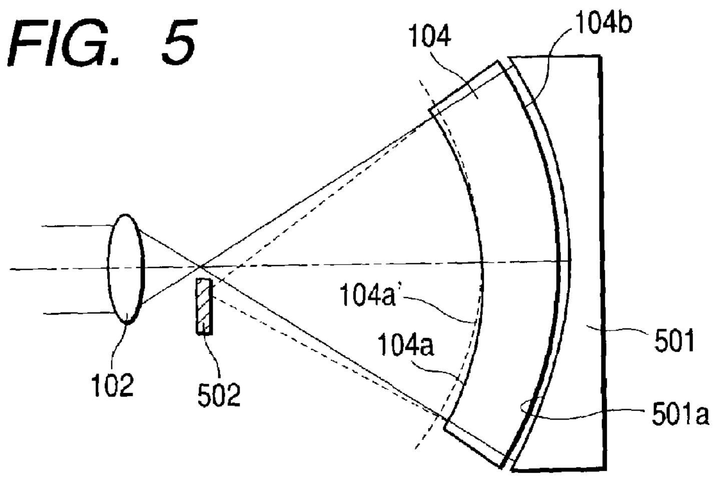
FIG. 5 is a view useful in explaining a fourth embodiment of the present invention.

FIG. 5 is a view for explaining a fourth embodiment of the present invention. Since the laser 101, the lens 121, the beam splitter 122, the collimator lens 123, the imaging lens 106, the CCD lens 107, the computer 130, and the display device 131 are the same as those in the first embodiment, these constituent elements are not illustrated in FIG. 5, and only the constituent elements different from the first embodiment are illustrated. In the present embodiment, the same constituent elements as those of the first embodiment are designated with the same reference numerals.

In the present embodiment, a concave-type optical surface 501a having a large radius of curvature of a lens 501 which is arranged on the side opposite to the laser 101 (not shown) as the light source of the lens 104 is measured using the convex-type optical surface 104b of the lens 104 the shape of which was measured by the first embodiment.

As shown in FIG. 5, after the shape of the convex-type optical surface 104b of the lens 104 has been measured in accordance with the method of the first embodiment, in the state in which the lens 104 is held as it is, the lens 501 having the concave-type optical surface 501a is arranged on the side opposite to the laser 101 as the light source of the lens 104. By adopting such an arrangement, there is constructed the Fizeau interferometer in which the optical surface 104b is made the reference surface, and the optical surface 501a is made the surface to be measured, and thus the surface 501a to be measured is measured. At this time, the light wave shaping plate is already removed. In this connection, since there is need for blocking the reflected light from the optical surface 104a, a light blocking plate 502 is inserted to cut off the reflected light from the optical surface 104a.

By the way, since the purpose of provision of the light blocking plate 502 is to cut off the reflected light from the optical surface 104b, another means such as application of a film adapted to reduce refractive index to the optical surface 104a may also be available as long as it can cut off the reflected light from the optical surface 104b.

In the present embodiment, since the convex-type optical surface 104b of the lens 104 is made the reference surface, the concave-type optical surface 501a having a large radius of curvature can be measured with high accuracy. In addition, since the surface interval between the convex-type optical surface 104b being the reference surface and the concave-type optical surface 501a being the surface to be measured can be shortened, it is possible to carry out the highly accurate measurement which does not suffer the influence of the disturbance such as the air fluctuation or the like.

In addition, since the interferometer of the main body is not removed, and also the lens being the reference surface is not removed after measurement of the reference surface, the fluctuation of the physical surface shape of each optical surface is extremely small. Also, since the positional relationship between the camera of the interferometer and the optical element is held, the measurement of the absolute accuracy can be implemented with high reliability.

(Fifth Embodiment)

Figure 6A:
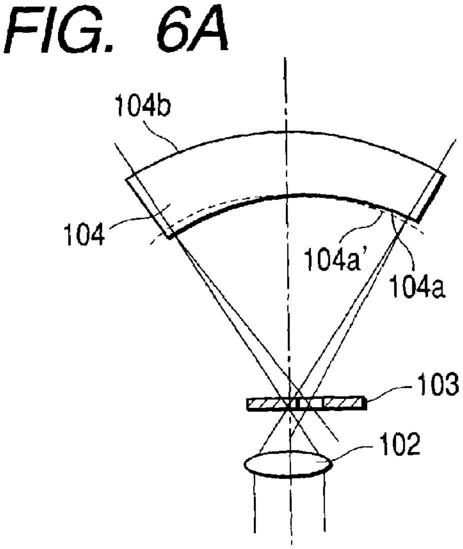
FIGS. 6A, 6B and 6C are views useful in explaining a fifth embodiment of the present invention.
Figure 6B:
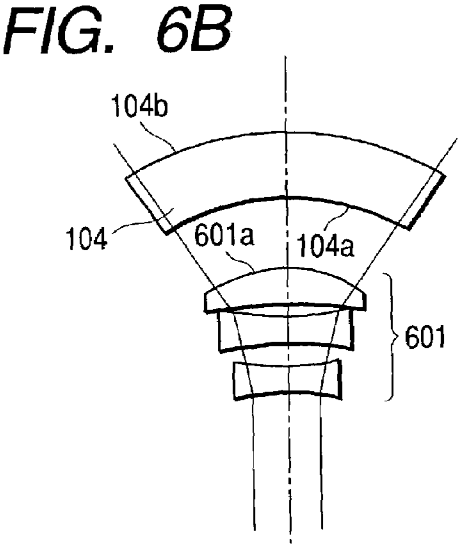
Figure 6C:
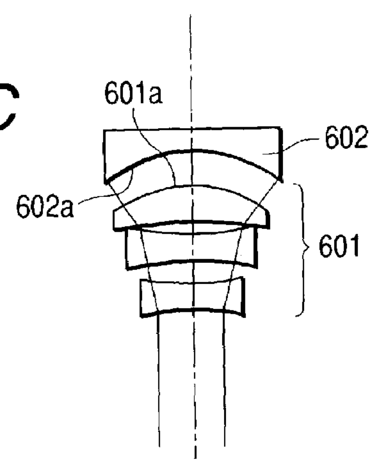

FIGS. 6A to 6C are views for explaining a fifth embodiment of the present invention. Since the laser 101, the lens 121, the beam splitter 122, the collimator lens 123, the imaging lens 106, the CCD lens 107, the computer 130, and the display device 131 are the same as those in the first embodiment, these constituent elements are not illustrated in FIG. 6A to 6C, and only the constituent elements different from the first embodiment are illustrated. In the present embodiment, the same constituent elements as those in the first embodiment are designated with the same reference numerals.

In the present embodiment, a TS lens surface for a divergence-type Fizeau interferometer which is arranged between the pinhole 103a and the lens 104 is measured using the concave-type optical surface 104a of the lens 104 the shape of which was measured in accordance with the method of the first embodiment. Moreover, the lens 104 is removed, and another lens having a concave-type surface to be measured is arranged in the position of the lens 104, whereby a concave-type surface to be measured is measured accurately using the TS lens surface which is already measured.

FIG. 6A is a view illustrating the state in which the optical surface 104a is measured in accordance with the method shown in the first embodiment. The absolute shape of the optical surface 104a as the surface to be measured is measured in accordance with the method shown in the first embodiment. Next, as shown in FIG. 6B, both the lens 102 and the light wave shaping plate 103 are removed, and instead thereof, a divergence-type TS lens 601 is inserted. The curvature center of the optical surface 601a of the divergence-type TS lens 601 is aligned with the curvature center of the optical surface 104a to construct a Fizeau interferometer. Then, an optical surface 601a of the TS lens is measured with the optical surface 104*a* the absolute shape of which is already obtained as the reference surface.

In this case, since the convex-type optical surface 601*a* and the concave-type optical surface 104*a* are arranged in the form of the interference surfaces, it is possible to shorten the surface interval thereof, and there is also expected the highly accurate measurement which does not suffer the influence of the disturbance such as the air fluctuation or the like.

In addition, in this case, since the reflected light from the optical surface 104*b* becomes the unnecessary light and exerts an influence on the measurement, there is required a device for applying a film adapted to reduce reflectivity to the optical surface 104*b*, or blocking the light from the optical surface 104*b* at the pinhole (not shown).

Next, as shown in FIG. 6C, the lens 104 is removed, and instead thereof, a lens 602 being the object to be measured is arranged. This time, a concave-type surface 602*a* to be measured of the lens 602 is measured using, as the reference surface, the optical surface 601*a* of the divergence-type TS lens which is already measured this time.

In the present embodiment, similarly to FIG. 6B, since the convex-type optical surface 601*a* as the reference surface and the concave-type optical surface 602*a* are arranged in the form of the interference surfaces, it is possible to shorten the surface interval thereof, and there is also expected the highly accurate measurement which does not suffer the influence of the disturbance such as the air fluctuation or the like.

In addition, in the present embodiment, since the interferometer of the main body is not moved and the lens 104 which is used as the prototype when inserting the TS lens is also not moved, the variation of the physical surface shape used in the measurement is very small. Also, since the positional relationship between the camera of the interferometer and the optical elements is also held, the shape measurement of the absolute accuracy can be implemented with high reliability.

In the present embodiment, since there is no restriction of a radius of curvature, concave or convex shape, or the like to the shape of the lens to be measured, and also there is no restriction of giving the reference surface the decentering in the case of the arrangement, the shape measurement can be carried out more generally for the lenses having various shapes. In addition, since the concave-type mirror as an object to be measured is not necessarily transparent and also all of such mirrors are not necessarily desirable in terms of the shape of the lens, the use method described in the present embodiment is more practical as the general-purpose use method.

By the way, the divergence-type TS lens means the lens which is designed in such a way that a reference surface is a convex surface and hence the emitted light is diverged therethrough.

(Sixth Embodiment)

Figure 7A:
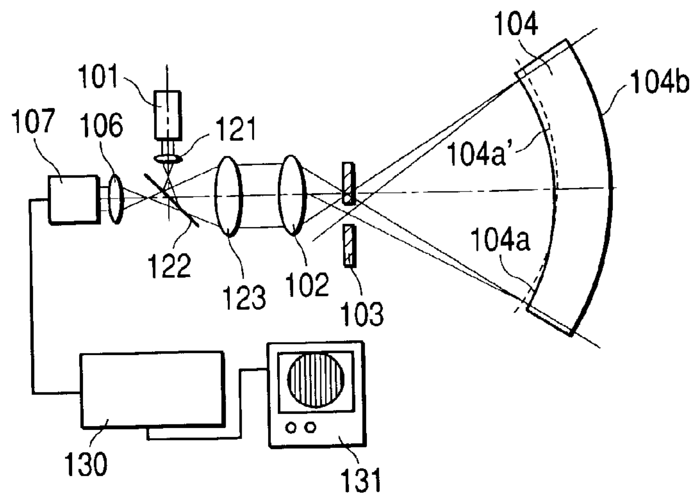
FIGS. 7A, 7B and 7C are views useful in explaining a sixth embodiment of the present invention.
Figure 7B:
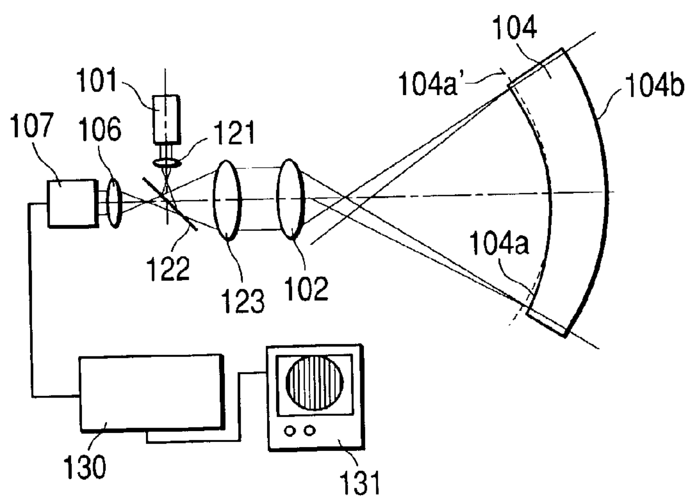
Figure 7C:
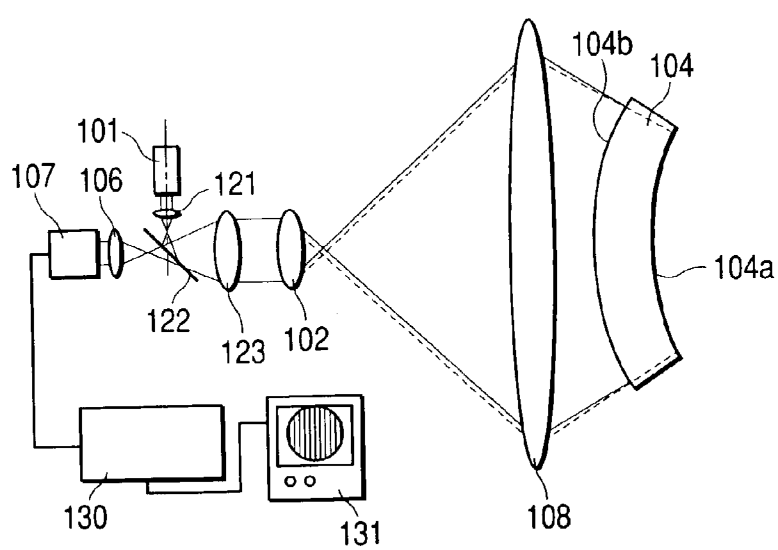

FIGS. 7A to 7C show a sixth embodiment of the present invention. FIG. 7A is the same as FIG. 1 showing the first embodiment of the present invention. First of all, the shape of the optical surface 104*a* as the surface to be measured of the lens 104 is measured by making the measurement light reflected by the optical surface 104*a* and the reference light reflected by the optical surface 104*b* as the reference surface interfere with each other.

Next, the shape of the optical surface 104*b* is measured using the optical surface 104*a* the absolute accuracy of which was measured in accordance with the above-mentioned shape measuring method. As shown in FIG. 7B, after the optical surface 104*a* has been measured in accordance with the above-mentioned measurement method, the light wave shaping plate 103 is removed to thereby allow construction of the Fizeau interferometer in which the optical surface 104*a* is made the reference surface and the optical surface 104*b* is made the surface to be measured. Consequently, the optical surface 104*b* can be measured with the measured optical surface 104*a* as the reference surface in accordance with the measurement method using the normal Fizeau interferometer which is already known. In this connection, the error due to the refractive index distribution of a glass material of the lens 104 is contained in the result of measurement of the optical surface 104*b*.

Next, another method of measuring the optical surface 104*b* will now be described with reference to FIG. 7C. The direction of the optical surface 104*a* and the optical surface 104*b* of the lens 104 is changed by a unit (not shown) to arrange the lens 104 in the optical path of the lens 101. In the case of the present embodiment, since the optical surface 104*b* of the lens 104 is of a convex-type and the optical surface 104*a* thereof is of a concave-type, the convex-type lens 108 is arranged between the laser and the lens 104 so that the light waves are made incident and reflected nearly perpendicularly to and from the optical surfaces 104*b* and 104*a*. By adopting such an arrangement, it is possible to construct the Fizeau interferometer in which the optical surface 104*a* is made the reference surface and the optical surface 104*b* is made the surface to be measured. Consequently, the optical surface 104*b* can be measured with the measured optical surface 104*a* as the reference surface in accordance with the measurement method using the normal Fizeau interferometer which is already known. In this connection, the error due to influences of the refractive index distribution of a glass material of the lens 104 is contained in the result of measurement of the optical surface 104*b*.

Next, the influences due to the refractive index distribution of the glass material of the lens 104 are cancelled from the result of measurement of the optical surface 104*b* in accordance with the method shown in FIG. 7B and the result of measurement of the optical surface 104*b* in accordance with the method shown in FIG. 7C to measure the absolute shape of the optical surface 104*b* with high accuracy. Here, the procedure of canceling the influences due to the refractive index distribution of the glass material of the lens 104 to measure the absolute shape of the optical shape 104*b* with high accuracy will now be described in detail.

It is assumed that the wave surface aberration of the laser beams emitted from the interferometer due to the optical system provided inside the interferometer and including the condensing lens 102, the collimator lens 123 and the like is W0, the wave surface aberration due to the shape of the concave-type optical surface 104*a* of the lens 104 is #1, the wave surface aberration due to the shape of the convex-type optical surface 104*b* is #2, and the wave surface aberration due to the refractive index distribution of the glass material of the lens 104 is W12. In addition, for the sake of convenience, it is assumed that the wave surface aberration in the reflected light due to the optical system provided inside the interferometer and including the condensing lens 102, the collimator lens 123 and the like is W0', and the wave surface aberration in the reflected light due to the refractive index distribution of the glass material of the lens 104 is W12'.

First of all, the description will be given with respect to the measurement method shown in FIG. 7A in which the optical surface 104*b* is made the reference surface and the optical surface 104*b* is made the surface to be measured. The light reflected by the optical surface 104*b* travels the path of the interferometer→the pinhole 103*a*→the lens 104→the optical surface 104*b*→the pinhole 103*a*→the interferometer (image pickup device 107). At this time, it is assumed that the wave surface aberration of the wave surface of the laser beams received by the image pickup device 107 is D1. In addition, the light waves reflected by the optical surface 104*a* travel the path of the interferometer→the pinhole 103*a*→the optical surface 104*a*→the window 103*b*→the interferometer (image pickup device 107). At this time, it is assumed that the wave surface aberration of the laser beams received by the interferometer (image pickup device 107) is D2.

The light waves passed through the pinhole become the ideal spherical waves and have no aberration. Consequently, the following relationship is obtained.

$$D1=W0' \quad \text{(Expression 1)}$$

$$D2=\#1+W0' \quad \text{(Expression 2)}$$

The interference fringes formed on the CCD camera 107 as the image pickup device are generated due to the difference in wave surface aberration between the two light waves. Assuming that the difference in wave surface aberration between the two light waves is E1, since the relationship of E1=D2−D1 is established, the following Expression is obtained.

$$E1=\#1 \quad \text{(Expression 3)}$$

Then, the interference fringes corresponding to this value are generated to be analyzed by the computer 130 to thereby measure the absolute shape of the concave-type optical surface 104*a*.

Next, the description will now be given with respect to the case where the light wave shaping plate 103 is removed from the optical path, and the measured optical surface 104*a* is made the reference surface and the optical surface 104*b* is made the surface to be measured. The interference of the reflected light from the optical surface 104*a* and the reflected light from the optical surface 104*b* is obtained in accordance with the measurement method shown in FIG. 7B. At this time, when the wave surface aberration of the reflected light from the optical surface 104*a* is assumed to be D3, the wave surface aberration D4 of the reflected light from the optical surface 104*b* is expressed as follows.

$$D3=W0+\#1+W0' \quad \text{(Expression 4)}$$

$$D4=W0+W12+\#2+W12'+W0' \quad \text{(Expression 5)}$$

When the difference in wave surface aberration between the two wave surfaces is assumed to be E2, since the relationship of E2=D3−D4 is established, the following Expression is obtained.

$$E2=\#1-(W12+\#2+W12') \quad \text{(Expression 6)}$$

Next, similarly to FIG. 7C, the positions of the optical surface 104*a* and the optical surface 104*b* of the homocentric lens are changed over to each other and then the interference of the reflected light from the optical surface 104*a* and the reflected light from the optical surface 104*b* is measured again. In this connection, when the diameter of the homocentric work to be measured is large, the lens 108 may be added. The purpose of providing the lens 108 is to condense the condensed or diverged laser beams through the condensing lens 102 again to make the measurement light incident perpendicularly to the optical surfaces 104*b* and 104*a*. The construction in which the lens 108 is added is shown in FIG. 7C. In this case, the wave surface aberration of the measurement light emitted from the interferometer is assumed to be W1. Thus, the wave surface aberration D5 of the reflected light from the optical surface 104*b*, and the wave surface aberration D6 of the reflected light from the optical surface 104*a* are expressed as follows, respectively.

$$D5=W1+\#2+W1' \quad \text{(Expression 7)}$$

$$D6=W1+W12+\#1+W12'+W1' \quad \text{(Expression 8)}$$

Then, when the difference in wave surface aberration between the two wave surfaces is assumed to be E3, since the relationship of E3=D6−D5 is established, the following Expression is obtained.

$$E3=W12+\#1+W12'-\#2 \quad \text{(Expression 9)}$$

When there is no need for inserting the lens 108, Expressions 7 and 8 are transformed into the following Expressions, respectively.

$$D5=W0+\#2+W0' \quad \text{(Expression 10)}$$

$$D6=W0+W12+\#1+W12'+W0' \quad \text{(Expression 11)}$$

However, the difference E3' in wave surface aberration between the two wave surfaces is expressed as follows.

$$E3'=W12+\#1+W12'-\#2 \quad \text{(Expression 12)}$$

Thus, Expression 12 is completely the same as Expression 9.

Here, though with respect to the wave surface aberrations W12 and W12' due to the refractive index distribution of the glass material of the homocentric lens 104, the travelling directions of the light waves are opposite to each other, the values of the wave surface aberrations W12 and W12' are equal to each other, since the light waves pass through the same position in the glass material. Similarly, though with respect to the wave surface aberrations W0 and W0' due to the optical system provided inside the interferometer, the travelling directions of the light waves are opposite to each other, the values of the wave surface aberrations W12 and W12' are equal to each other since these light waves pass through the inside of the same interferometer. Consequently, from Expression 6 and Expression 9 (Expression 12), the following Expression is established.

$$E2-E3=E=2\times\#1-2\times\#2 \quad \text{(Expression 13)}$$

Since E2 and E3 are obtained with the image pickup device 107, and also #1 is already measured from Expression 3, the absolute shape of #2 can be measured from Expression 13. In this measurement method, since the influences of the refractive index distribution of the glass material of the lens 104 are cancelled and also a portion other than the glass member of the lens 104 is the common optical path, it is possible to carry out very highly accurate measurement.

In addition, the three measurements shown in FIGS. 7A to 7C are carried out in a manner as described above, whereby the absolute shape of the optical surface 104*b* can be measured with high accuracy. By adopting such construction, it is possible to adopt the construction of the Fizeau interferometer in which the reference optical axis is nearly aligned with the optical axis to be measured to allow the apparatus to be miniaturized. In addition, by making the optical surface 104*b* the reference surface, even the convex-type optical surface, for which it is normally postulated that the measurement thereof is difficult, can be readily measured. In addition, since the mirror member is unnecessary for the pinhole portion, the contamination and the fine irregularity of the mirror exert no influence on the measurement. Also, since the whole divergent luminous fluxes from the pinhole can be used as the measurement light, the measurement is prevented from becoming unstable due to insufficiency in quantity of light, and hence the accurate shape measurement can be carried out surely. Moreover, since there is no limit to the area in which an object to be measured is arranged, even a large object to be measured can be measured.

By the way, while in the present embodiment, the optical surface 104*a* is made the surface to be measured and the optical surface 104*b* is made the reference surface, alternatively, it is also possible that the optical surface 104*a* is made the reference surface and the optical surface 104*b* is made the surface to be measured. In this case, the light to be made incident to the optical surface 104*a* is made incident perpendicularly to the optical surface 104*a*, and the reflected light traces accurately the same path to pass through the pinhole 103*a* again. On the other hand, the light waves reflected by the optical surface 104*b* are not returned back to the pinhole 103*a* since the optical surface 104*b* is decentered from the optical surface 104*a*, but passes through the window 103*b* which is provided adjacent to the pinhole 103*a*.

In addition, for the measurement of the shape of the optical surface 104*a*, the method shown in FIG. 7A is not necessarily adopted, and hence the measurement may also be carried out by utilizing a different method. In this case as well, the refractive index distribution of the glass material of the lens 104 can be cancelled by utilizing the same method as that described above, and hence the absolute shape of the optical surface 104*b* can be measured with high accuracy.

(Seventh Embodiment)

Next, a seventh embodiment of the present invention will be described with reference to FIG. 8. In the present embodiment, two interferometers are installed on the both sides of the lens 104 shown in the sixth embodiment so as to face each other, whereby the measurement similar to that in the first embodiment can be carried out.

Figure 8:
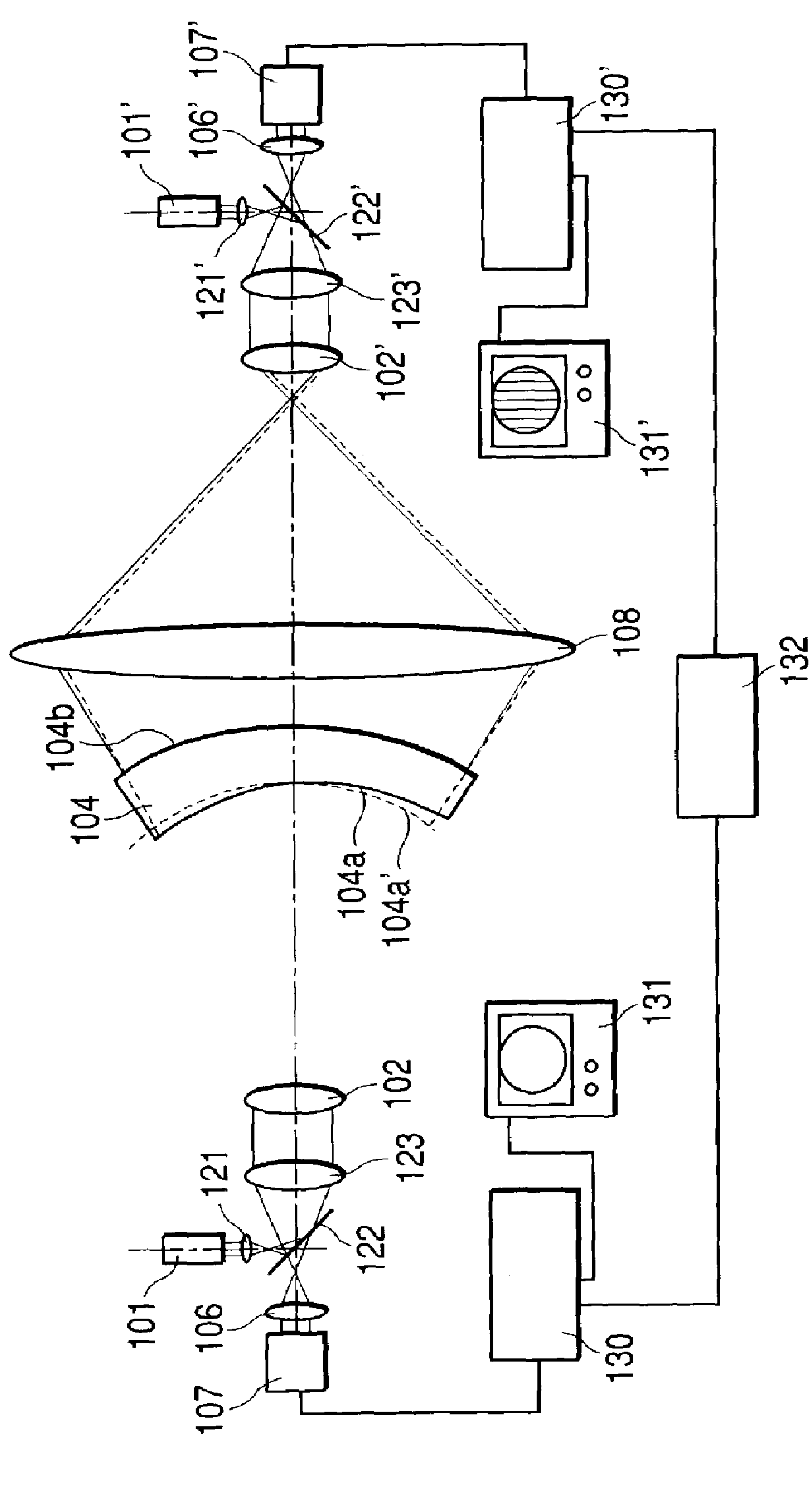
FIG. 8 is a view useful in explaining a seventh embodiment of the present invention.

As shown in FIG. 8, on the side of the optical surface 104*a* of the lens 104, similarly to the first embodiment, there are arranged the laser 101, the lens 121, the beam splitter 122, the collimator lens 123, the imaging lens 106, the CCD lens 107, the computer 130, and the display device 131. In addition, on the side of the optical surface 104*b* of the lens 104, there are arranged the laser 101', the lens 121', the beam splitter 122', the collimator lens 123', the imaging lens 106', the CCD lens 107', the computer 130', and the display device 131'. Also, reference numeral 132 designates an arithmetic operation unit for arithmetically operating the measurement result from the computer 130 and the measurement result from the computer 130'.

First of all, the shape of the optical surface 104*a* is measured in accordance with the measurement method shown in FIG. 7A of the sixth embodiment. Next, the shape of the optical surface 104*b* is measured in accordance with the measurement method shown in FIG. 7B of the first embodiment. In this connection, the error due to the refractive index distribution of the glass material of the lens 104 is contained in the result of the measurement of the optical surface 104*b*. Next, as shown in FIG. 8, the optical surface 104*b* is measured using the laser 101', the lens 121', the beam splitter 122', the collimator lens 123', the imaging lens 106', the CCD lens 107', the computer 130', and the display device 131' without moving the lens 104 at all. At this time, there is constructed the Fizeau interferometer in which the optical surface 104*a* is made the reference surface and the optical surface 104*b* is made the surface to be measured. From the three measurement results, similarly to the above-mentioned first embodiment, the refractive index distribution of the glass material of the lens 104 can be cancelled, and hence the absolute shape of the optical surface 104*b* can be measured with high accuracy.

In accordance with the present embodiment, in addition to the effects obtained in the above-mentioned sixth embodiment, there is offered the effect that since the lens having the surface to be measured is not moved, and the interferometers of the main body are also not moved, the measurement of the absolute accuracy can be implemented with high reliability because the variation in the physical surface shape for use in the measurement is very small.

By the way, while in the present embodiment, the construction of using the two interferometers is adopted, such construction is also available that the measurement light from one interferometer is divided into two parts which can be measured from both sides of the lens.

(Eighth Embodiment)

Figure 9:
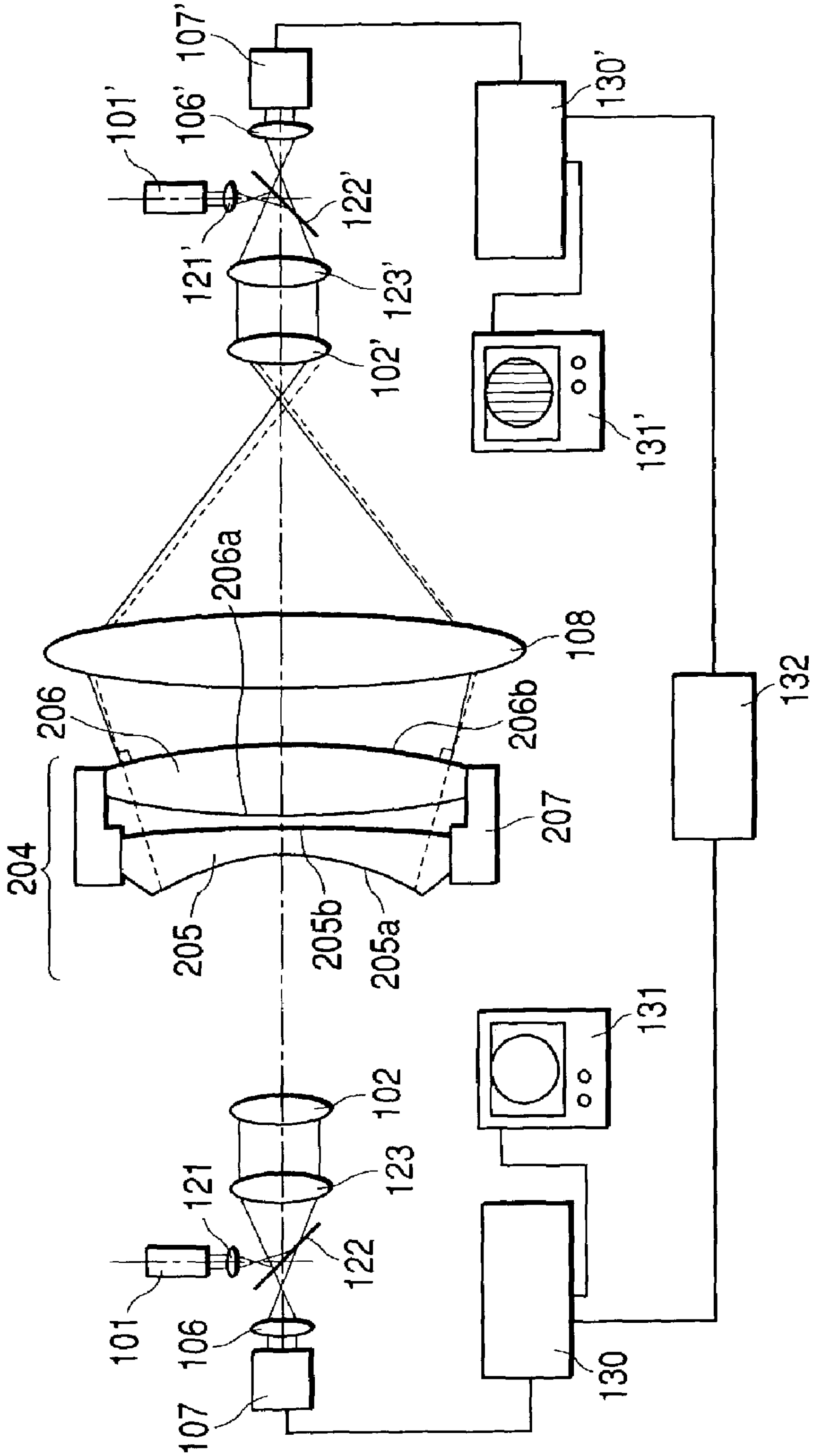
FIG. 9 is a view useful in explaining an eighth embodiment of the present invention.
Figure 10:
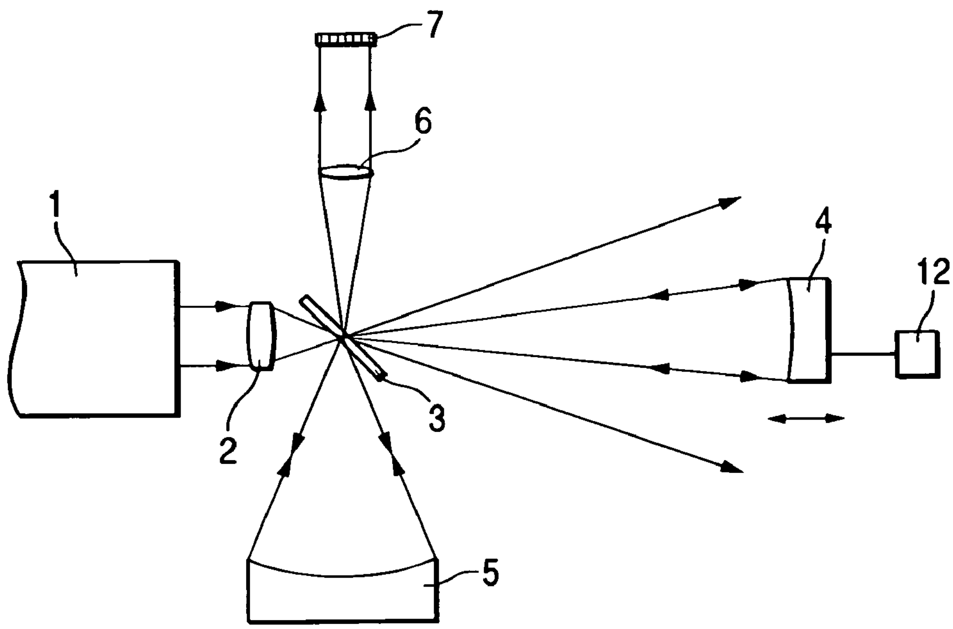
FIG. 10 is a view useful in explaining a first prior art.
Figure 11:
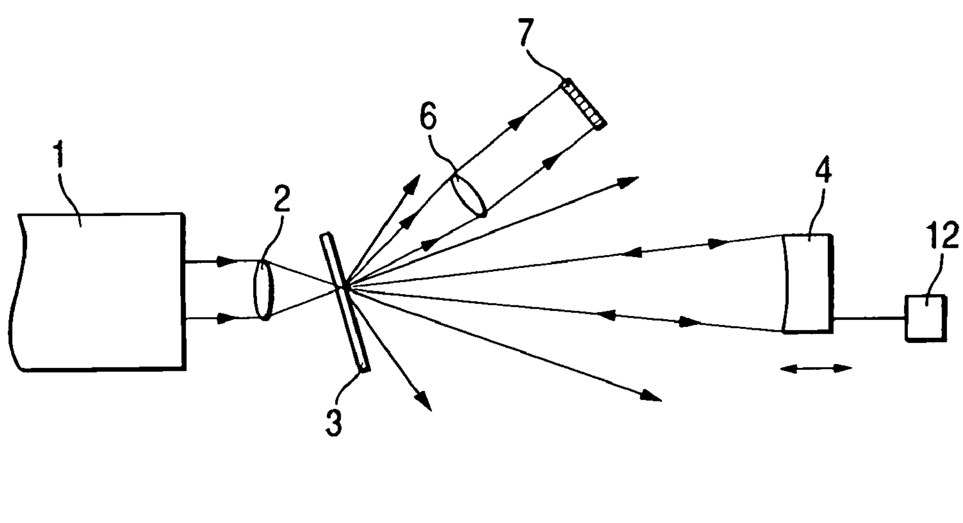
FIG. 11 is a view useful in explaining a second prior art.

FIG. 9 shows an eighth embodiment of the present invention. While the present embodiment is similar in apparatus construction to the above-mentioned seventh embodiment, a lens is not a single lens, but is a lens group 204 formed of a plurality of lenses shown in FIG. 3 in the above-mentioned second embodiment. Since the construction of the lens group 204 is the same as that of FIG. 3, and the constituent elements other than the lens group 204 are the same as those of the seventh embodiment, the same constituent elements are designated with the same reference numerals and the description thereof is omitted here for the sake of simplicity.

First of all, the shape of the optical surface 205*a* becoming the surface to be measured is measured in accordance with the same method as that of the second embodiment using the laser 101, the lens 121, the beam splitter 122, the collimator lens 123, the imaging lens 106, the CCD lens 107, the computer 130, and the display device 131.

Next, the light wave shaping plate 103 is removed to construct the Fizeau interferometer in which the optical surface 205*a* is made the reference surface and the optical surface 206*b* is made the surface to be measured to thereby measure the optical surface 206*b*.

Next, the optical surface 104*b* is measured using the laser 101', the lens 121', the beam splitter 122', the collimator lens 123', the imaging lens 106', the CCD lens 107', the computer 130', and the display device 131' without moving the lens group 204 at all. At this time, there is constructed the Fizeau interferometer in which the optical surface 205*a* is made the reference surface and the optical surface 206*b* is made the surface to be measured.

From the three measurement results, similarly to the above-mentioned first and second embodiments, the influences due to the refractive index distribution of the glass material of the lens group 204 can be cancelled and hence the absolute shape of the optical surface 206*b* can be measured with high accuracy.

In accordance with the present embodiment, in addition to the effects obtained in the above-mentioned sixth and seventh embodiments, there is offered the effect that even when the optical surface 206*b* is a convex-type optical surface or a concave type optical surface having a large radius of curvature, or the flat surface, the light waves can be made incident perpendicularly thereto by the design of the lens group 204. In addition, since with respect to the convex-type optical surface having a large radius of curvature, the air length can be shortened, the influence of the air fluctuation exerted on the measurement accuracy is less and hence it is possible to carry out very highly stable measurement. In addition, the apparatus space can also be saved.

As described above, in the present invention, there are provided a shape measuring apparatus and a shape measuring method having: a light source; a condensing lens for condensing temporarily the light waves from the light source; and a light wave shaping plate in which a pinhole adapted to convert the condensed light waves into ideal spherical waves and a window provided in the vicinity of the pinhole and adapted to pass therethrough the light wave information are formed. At least one lens having a reference surface and a surface to be measured, the optical axes of which are decentered from each other, is arranged in the optical path of the light waves passed through the pinhole and in the position where the light waves are made incident perpendicularly to the reference surface, and the reflected light waves pass through the pinhole again, and the light waves reflected by the measurement surface pass through the window. The light reflected by the reference surface which has passed through the pinhole again, and the light reflected by the surface to be measured which has passed through the window are made to interfere with each other to measure the shape of the surface to be measured.

From the construction as described above, it is possible to adopt the Fizeau interferometer in which the reference optical axis is nearly aligned with the measurement optical axis, and hence it becomes possible to miniaturize the apparatus. In addition, by making the optical surface 104*b* the reference surface, even a convex type optical surface, for which it is normally postulated that the measurement thereof is difficult, can be readily measured. In addition, since the mirror member is unnecessary for the pinhole portion, contamination and fine irregularity of the mirror exert no influence on the measurement. Moreover, since the whole divergent luminous fluxes from the pinhole can be used as the measurement light, the measurement is prevented from becoming unstable due to insufficiency in quantity of light and hence the accurate shape measurement can be carried out surely. Also, since there is no restriction to the area in which an object to be measured is arranged, even a large object to be measured can be measured.

In addition, the measurement of a shape of a convex surface is also possible in accordance with the shape measuring method in which the light wave shaping plate is removed, and the reflected light from the surface to be measured and the reflected light from the reference surface are made to interfere with each other to measure the shape of the reference surface.

In addition, the lens having the surface to be measured is constituted by the lens group formed of a plurality of lenses, whereby even if the surface to be measured and the reference surface do not have the same curvature center, the measurement can be carried out. Thus, even a convex-type optical surface or a concave-type optical surface having a large radius of curvature, or a flat surface can be measured to increase greatly the variation of the measurable lenses. Moreover, since with respect to a convex-type optical surface having a large radius of curvature, the air length can be shortened, the influence of the air fluctuation exerted on the measurement accuracy is less and hence very highly stable measurement can be carried out.

In addition, the reference surface is made the mirror member different from the lens or the lens group having the surface to be measured, whereby the measurement of a convex-type surface or a concave-type surface having a large radius of curvature becomes possible at the short distance from the condensing point, and hence the miniaturization of the apparatus can be attained and also the reduction in accuracy due to the air fluctuation can be prevented. Moreover, since the light is reflected by the optical reflecting surface, the loss in quantity of light is less and hence more accurate shape measurement becomes possible. Also, the positions of the pinhole and the window of the light wave shaping plate do not need to be previously adjusted on the basis of the radius of curvature of the surface to be measured and a quantity of decentering with respect to the optical axis, and it is possible to cope with such a situation by adjusting the position of the mirror member 305. Thus, the design of the lens or the lens group being an object to be measured does not need to be made measurable, and hence the wide application as the measuring apparatus is greatly enhanced.

In addition, after the surface to be measured has been measured in accordance with the above-mentioned shape measuring method, the light wave shaping plate is removed and the reflected light from the surface to be measured and the reflected light from the reference surface are made to interfere with each other to measure the shape of the reference surface, whereby a convex-type optical surface, for which it is normally postulated that the measurement thereof is difficult, can be measured with high accuracy.

In addition, after the convex-type optical surface has been measured in accordance with the above-mentioned shape measuring method, the light wave shaping plate is removed, an optical element having a second surface to be measured is arrange on the side of the lens opposite to the light source, and the reflected light from the second surface to be measured and the reflected light from the convex-type optical surface are made to interfere with each other to measure the shape of the second surface to be measured, whereby the concave-type optical surface having a large radius of curvature can be measured with high accuracy. Moreover, since it is possible to shorten the surface interval between the convex type optical surface being the reference surface and the concave-type optical surface being the surface to be measured, the highly accurate measurement can be carried out which does not suffer the influence of the disturbance such as the air fluctuation or the like. Also, since the interferometer of the main body is not moved and the lens being the reference surface is not moved after measuring the reference surface, the variation of the physical surface shape used in the measurement is very small. Also, since the positional relationship between the camera of the interferometer and the optical element is also held, the measurement of the absolute accuracy can be implemented with high accuracy.

In addition, after the surface to be measured has been measured in accordance with the above-mentioned shape measuring method, both the light wave shaping plate and the condensing lens are removed, a divergence-type TS lens is arranged between the light source and the lens, and the reflected light from the surface to be measured and the reflected light from the reference surface of the divergence-type TS lens are made to interfere with each other to measure the shape of the reference surface of the divergence-type TS lens. Consequently, the surface accuracy of the divergence TS lens can be measured with high accuracy.

Furthermore, after the reference surface of the divergence-type TS lens has been measured in accordance with the above-mentioned shape measuring method, the lens is removed, a lens having a third surface to be measured is arranged in the position where the lens has been removed, and the reflected light from the reference surface of the divergence-type TS lens and the reflected light from the third surface to be measured are made to interfere with each other to measure the shape of the third surface to be measured. Thus, since the measurement can be carried out without involving the intersection or the error in position between the apparatuses at all, the shape of the surface to be measured of the second lens can be measured with very high accuracy.

In addition, in the present invention, there are provided a shape measuring apparatus and a method thereof using an interferometer for measuring a shape of a surface to be measured of a lens having an optical surface becoming a reference surface and an optical surface becoming the surface to be measured, including: a unit for making light waves incident from one direction of an optical axis of the surface to be measured to make reflected light from the reference surface and reflected light from the surface to be measured interfere with each other to thereby measure a shape of the surface to be measured; a unit for making light waves from the opposite direction of the optical axis of the surface to be measured to make reflected light from the reference surface and reflected light from the surface to be measured interfere with each other to thereby measure a shape of the surface to be measured; and a unit for calculating the shape of the surface to be measured on the basis of the two measurement results. Thus, the absolute shape can be measured with high accuracy without being influenced by the refractive index distribution of the lens member.

Moreover, the shape measuring apparatus has a reversal unit for reversing the lens with which the lens is reversed to measure the shape of the surface to be measured from the both sides of the lens to allow the measurement to be carried out without moving one interferometer. Thus, it is possible to greatly reduce the cost and save the space of the apparatus.

Also, the above-mentioned two units for measuring the shape of the surface to be measured are arranged on the both sides of the lens so as to face each other, whereby the lens having the surface to be measured is not moved and also the interferometer of the main body is not moved. Thus, since the variation in the physical surface shape used in the measurement is very small, the measurement of the absolute accuracy can be implemented with high reliability.

In addition, the above-mentioned shape measuring apparatus is adapted to optically separate light from one interferometer into two parts to measure the shape of the surface to be measured from the both sides of the lens. Thus, since the measurement can be carried out without moving one interferometer, it is possible to greatly reduce the cost and save the space of the apparatus. In addition thereto, since the lens having the surface to be measured is not moved, the variation in the physical surface shape used in the measurement is very small, and hence the measurement of the absolute accuracy can be implemented with high reliability.

Furthermore, there is provided a shape measuring method using an interferometer, in which after the surface to be measured has been measured in accordance with the above-mentioned shape measuring method, an optical element having a second surface to be measured is arranged so as to be opposite to the surface to be measured, and the reflected light from the second surface to be measured and the reflected light from the surface to be measured are made to interfere with each other to measure the shape of the second surface to be measured with the above-mentioned measuring unit.

As a result, since there is carried out very highly accurate shape measurement in which for the optical surface becoming the reference surface, the influences due to the refractive index distribution of the glass material are cancelled, the surface to be measured can be measured with very high accuracy. In addition, if a convex-type optical surface of a lens is made a reference surface, then a concave-type optical surface having a large radius of curvature can be measured with high accuracy. Moreover, since it is possible to shorten the surface interval between the convex-type optical surface becoming a reference surface and the concave-type optical surface becoming a surface to be measured, the highly accurate measurement can be carried out without being influenced by the disturbance such as the air fluctuation or the like. Also, since an interferometer of a main body is not moved and a lens becoming a reference surface is not moved after measuring the reference surface, the variation in the physical surface shape of each optical surface is very small. Also, since the positional relationship between a camera of an interferometer and an optical element is also held, the measurement of the absolute accuracy can be implemented with high reliability.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is, therefore, to be determined solely by the appended claims.

What is claimed is:

1. A shape measuring apparatus using an interferometer, comprising:

a light source;

a condensing lens for condensing temporarily light waves from the light source;

a light wave shaping plate in which a pinhole adapted to convert the condensed light waves into an ideal spherical wave and a window provided in the vicinity of the pinhole and adapted to pass therethrough the light wave surface information are formed;

at least one lens having a reference surface and a surface to be measured, and arranged on an optical path of the light waves passed through the pinhole, the optical axes of the reference surface and the surface to be measured being decentered from each other, the lens being adjusted in the position where the light waves reflected by the reference surface pass through the pinhole again and the light waves reflected by the measurement surface pass through the window; and image pickup means for making the reflected light reflected from the reference surface to pass through the pinhole again and the reflected light reflected from the surface to be measured to pass through the window interfere with each other, to measure a shape of the surface to be measured.

2. A shape measuring apparatus using an interferometer according to claim 1, wherein the lens is a single lens having concave-type and convex-type optical surfaces the curvature centers of which are slightly different from each other in the vicinity of the pinhole.

3. A shape measuring apparatus using an interferometer according to claim 2, wherein the surface to be measured is a concave-type optical surface of the lens nearest the pinhole, and the reference surface is a convex-type optical surface facing the concave type optical surface.

4. A shape measuring apparatus using an interferometer according to claim 1, wherein the lens is a lens group constructed of a plurality of lenses, and the reference surface and the surface to be measured are any ones of an optical surface of a lens nearest the pinhole and an optical surface of the lens different from the lens nearest the pinhole.

5. A shape measuring apparatus using an interferometer according to claim 4, wherein the surface to be measured is a concave-type optical surface nearest the pinhole of the lens nearest the pinhole, and the reference surface is an optical surface of the lens different from the lens nearest the pinhole.

6. A shape measuring apparatus using an interferometer, comprising:

a light source;

a condensing lens for condensing temporarily light waves from the light source;

a light wave shaping plate in which a pinhole adapted to convert the condensed light waves into an ideal spherical wave and a window provided in the vicinity of the pinhole and adapted to pass therethrough the light wave surface information are formed;

a mirror member having an optical surface becoming a reference surface for reflecting the light waves passed through the pinhole, and arranged in a position where the light waves reflected by the reference surface pass through the pinhole again;

at least one lens having an optical surface becoming a surface to be measured, and arranged between the pinhole and the mirror member, adjusted in the position where the light waves reflected by the measurement surface pass through the window; and image pickup means for making the reflected light reflected from the reference surface to pass through the pinhole again and the reflected light reflected from the surface to be measured to pass through the window interfere with each other, to measure a shape of the surface to be measured.

7. A shape measuring method using an interferometer for measuring a shape of a surface to be measured, the method comprising:

preparing a light source, a condensing lens for condensing temporarily light waves from the light source, and a light wave shaping plate in which a pinhole adapted to convert the condensed light waves into an ideal spherical wave and a window provided in the vicinity of the pinhole and adapted to pass therethrough the light wave surface information are formed;

arranging at least one lens having a reference surface and a surface to be measured, the optical axes of which are decentered from each other in an optical path of the light waves passed through the pinhole;

adjusting the lens in a position where the light waves reflected by the reference surface pass through the pinhole again, and the light waves reflected by the measurement surface pass through the window; and imaging with image pickup means the light waves obtained by making the reflected light reflected from the reference surface passing through the pinhole again, and the reflected light reflected from the surface to be measured passing through the window interfere with each other.

8. A shape measuring method using an interferometer according to claim 7, wherein the lens is a single lens having concave-type and convex-type optical surfaces the curvature centers of which are slightly different from each other in the vicinity of the pinhole.

9. A shape measuring method using an interferometer according to claim 8, wherein the surface to be measured is a concave-type optical surface of the lens nearest the pinhole, and the reference surface is a convex-type optical surface facing the concave-type optical surface.

10. A shape measuring method using an interferometer according to claim 7, wherein the lens is a lens group constructed of a plurality of lenses, and the reference surface and the surface to be measured are any one of an optical surface of a lens nearest the pinhole and an optical surface of the lens different from the lens nearest the pinhole.

11. A shape measuring method using an interferometer according to claim 10, wherein the surface to be measured is a concave-type optical surface nearest the pinhole of the lens nearest the pinhole, and the reference surface is an optical surface of the lens different from the lens nearest the pinhole.

12. A shape measuring method using an interferometer according to claim 7, wherein after the surface to be measured is measured in accordance with the shape measuring method, the light wave shaping plate is removed, and the reflected light from the surface to be measured and the reflected light from the reference surface are made to interfere with each other, to measure a shape of the reference surface.

13. A shape measuring method using an interferometer according to claim 7, wherein the optical surface of the lens opposite to the pinhole is a convex-type optical surface, and wherein the method comprises:

after the convex-type optical surface is measured in accordance with the shape measuring method, removing the light wave shaping plate;

arranging an optical element having a second surface to be measured on the side of the lens opposite to the light source; and making the reflected light from the second surface to be measured and the reflected light from the convex-type optical surface interfere with each other, to measure a shape of the second surface to be measured.

14. A shape measuring method using an interferometer according to claim 13, wherein the second surface to be measured is a concave-type optical surface.

15. A shape measuring method using an interferometer according to claim 7, further comprising:

after the surface to be measured is measured in accordance with the shape measuring method, removing the light wave shaping plate and the condensing lens;

arranging a divergence-type TS lens between the light source and the lens; and making the reflected light from the surface to be measured and the reflected light from a reference surface of the divergence-type TS lens interfere with each other to measure a shape of the reference surface of the divergence-type TS lens.

16. A shape measuring method using an interferometer according to claim 15, further comprising:

after the reference surface of the divergence-type TS lens is measured in accordance with the shape measuring method, removing the lens;

arranging a lens having a third surface to be measured in a position where the lens is removed; and making the reflected light from the reference surface of the divergence-type TS lens and the reflected light from the third surface to be measured interfere with each other, to measure a shape of the third surface to be measured.

17. A shape measuring method using an interferometer for measuring a shape of a surface to be measured, the method comprising:

preparing a light source, a condensing lens for condensing temporarily light waves from the light source, and a light wave shaping plate in which a pinhole adapted to convert the condensed light waves into an ideal spherical wave and a window provided in the vicinity of the pinhole and adapted to pass therethrough the light wave surface information are formed;

arranging a mirror member having an optical reflecting surface for reflecting the light waves passed through the pinhole;

arranging at least one lens having a surface to be measured the optical axis of which is decentered from the optical axis of other optical surface between the pinhole and the mirror member;

adjusting the mirror member in a position where light is made incident perpendicularly to the optical reflecting surface and the reflected light waves pass through the pinhole again; and imaging with image pickup means the light waves obtained by making the reflected light reflected from the optical reflecting surface passing through the pinhole again and the reflected light reflected from the surface to be measured passing through the window interfere with each other.

18. A shape measuring apparatus using an interferometer for measuring a shape of a surface to be measured of a lens having an optical surface forming a reference surface and an optical surface forming the surface to be measured, the apparatus comprising:

reversal means for reversing the lens;

first measurement means for making light waves incident to the surface to be measured, in order to make the reflected light from the reference surface and the reflected light from the surface to be measured interfere with each other, to measure a shape of the surface to be measured, the first measurement means being adapted to measure, after reversing the lens, the surface to be measured from the opposite two directions; and arithmetic operation means for arithmetically determining a shape of the surface to be measured from the two measurement results provided by the first measurement means.

19. A shape measuring apparatus using an interferometer according to claim 18, wherein the reference surface and the surface to be measured of the lens are decentered in optical axis from each other, and the first measurement means comprises:

a light source;

a condensing lens for condensing temporarily light waves from the light source;

a light wave shaping plate in which a pinhole adapted to convert the condensed light waves into an ideal spherical wave and a window provided in the vicinity of the pinhole and adapted to pass therethrough the light wave surface information are formed, the plate being adapted to enter/exit into/from the optical path of the light waves; and image pickup means for imaging the optical waves obtained by making the reflected light reflected from the reference surface and the reflected light reflected from the surface to be measured interfere with each other.

20. A shape measuring apparatus using an interferometer for measuring a shape of a surface to be measured of a lens having an optical surface forming a reference surface and an optical surface forming the surface to be measured, the apparatus comprising:

first measurement means for making light waves incident from one direction of an optical axis of the surface to be measured, in order to make the reflected light from the reference surface and the reflected light from the surface to be measured interfere with each other, to measure a shape of the surface to be measured;

second measurement means arranged opposite to the first measurement means for making light incident from an opposite direction of an optical axis of the surface to be measured, in order to make the reflected light from the reference surface and the reflected light from the surface to be measured interfere with each other, to measure a shape of the surface to be measured, the lens being arranged between the first measurement means and second measurement means; and arithmetic operation means for arithmetically determining the shape of the surface to be measured on the basis of the two measurement results provided by the first measurement means and second measurement means.

21. A shape measuring apparatus using an interferometer according to claim 20, wherein the reference surface and the surface to be measured of the lens are decentered, with respect to the optical axis, from each other, one of the first measurement means and second measurement means comprises:

a light source;

a condensing lens for condensing temporarily light waves from the light source; and image pickup means for imaging the light waves obtained by making the reflected light reflected from the reference surface and the reflected light reflected from the surface to be measured, interfere with each other, and the other one of the first measurement means and second measurement means comprises:

a light wave shaping plate in which a pinhole adapted to convert the condensed light waves into an ideal spherical wave and a window provided in the vicinity of the pinhole and adapted to pass therethrough the light wave surface information are formed, the plate being adapted to enter/exit into/from the optical path of the light waves.

22. A shape measuring apparatus using an interferometer according to claim 20, wherein the lens is a lens group constructed of a plurality of lenses.

23. A shape measuring method using an interferometer for measuring a shape of a surface to be measured of a lens having an optical surface forming a reference surface and an optical surface forming the surface to be measured, the method comprising:

carrying out first measurement of making light incident from one direction of an optical axis of the surface to be measured to make the reflected light from the reference surface and the reflected light from the surface to be measured interfere with each other, to measure the shape of the surface to be measured, with first measurement means having a light source, a condensing lens for condensing temporarily the light waves from the light source, and image pickup means for imaging the light waves obtained by making the reflected light reflected from the reference surface and the reflected light reflected from the surface to be measured interfere with each other;

reversing the lens;

carrying out second measurement with the first measurement means of making light incident from the opposite direction of the optical axis of the surface to be measured and making the reflected light reflected from the reference surface and the reflected light reflected from the surface to be measured interfere with each other; and arithmetically determining the shape of the surface to be measured on the basis of the two measurement results provided through the first measurement and second measurement.

24. A shape measuring method using an interferometer according to claim 23, wherein the reference surface and the surface to be measured of the lens are decentered, with respect to the optical axis from each other;

the first measurement means further has a light wave shaping plate in which a pinhole adapted to convert the condensed light waves into an ideal spherical wave and a window provided in the vicinity of the pinhole and adapted to pass therethrough the light wave surface information are formed, the plate being adapted to enter/exit into/from the optical path of the light waves;

the lens is arranged in the optical path of the light waves passed through the pinhole;

the light waves reflected by the surface to be measured pass through the pinhole again;

the light waves reflected by the reference surface pass through the window; and after the reflected light reflected from the surface to be measured to pass through the pinhole again and the reflected light reflected from the reference surface to pass through the window are made to interfere with each other, to measure the shape of the reference surface, the light wave surface information is removed from the optical path to carry out the first measurement and second measurement.

25. A shape measuring method using an interferometer for measuring a shape of a surface to be measured of a lens having an optical surface forming a reference surface and an optical surface forming the surface to be measured, the method comprising:

preparing first and second measurement means having a light source, a condensing lens for condensing temporarily light waves from the light source, and image pickup means for imaging the light waves obtained by making a reflected light reflected b from the reference surface and a reflected light reflected from the surface to be measured, interfere with each other;

carrying out first measurement with the first measurement means of making light incident from one direction of an optical axis of the surface to be measured and making the reflected light from the reference surface and the reflected light from the surface to be measured interfere with each other to measure the shape of the surface to be measured;

carrying out second measurement with the second measurement means arranged across the lens from the first measurement means of making light incident from the opposite direction of the one direction of the optical axis of the surface to be measured and making the reflected light from the reference surface and the reflected light from the surface to be measured interfere with each other, to measure the shape of the surface to be measured; and arithmetically determining the shape of the surface to be measured on the basis of two measurement results obtained from the first and second measurements.

26. A shape measuring method using an interferometer according to claim 25, wherein the reference surface and the surface to be measured of the lens are decentered, with respect to the in optical axis, from each other;

the first measurement means further comprises a light wave shaping plate in which a pinhole adapted to convert the condensed light waves into an ideal spherical wave and a window provided in the vicinity of the pinhole and adapted to pass therethrough light wave surface information, the plate being adapted to enter/exit into/from the optical path of the light waves;

the lens is arranged in the optical path of the light waves passed through the pinhole;

the light waves reflected by the surface to be measured pass through the pinhole again;

the light waves reflected from the reference surface pass through the window; and after the reflected light reflected from the surface to be measured to pass through the pinhole again and the reflected light reflected from the reference surface to pass through the window are made to interfere with each other, to measure the shape of the reference surface, the light wave surface information is removed from the optical path to carry out the first and second measurements.

27. A shape measuring method using an interferometer according to claim 25, wherein the lens is a lens group constructed of a plurality of lenses.

* * * * *

UNITED STATES PATENT AND TRADEMARK OFFICE

CERTIFICATE OF CORRECTION

PATENT NO. : 6,972,850 B2
APPLICATION NO. : 10/374142
DATED : December 6, 2005
INVENTOR(S) : Masaru Ohtsuka et al.

It is certified that error appears in the above-identified patent and that said Letters Patent is hereby corrected as shown below:

Column 3:

Line 14, "interrferometer" should read --interferometer--.

Column 4:

Lines 5-11, "Further, according to the present invention, there are provided a shape measuring apparatus and a shape measuring method using an interferometer in which the surface to be measured is a concave-type optical surface nearest the pinhole of the lens nearest the pinhole, and the reference surface is an optical surface of the lens different from the lens nearest the pinhole." should read --Further, according to the present invention, there are provided a shape measuring apparatus and a shape measuring method using an interferometer in which the lens is a lens group constructed of a plurality of lenses, and the reference surface and the surface to be measured are any one of an optical surface of a lens nearest the pinhole and an optical surface of the lens different from the lens nearest the pinhole.--.
Line 15, "concave type" should read --concave-type--.

Column 12:

Line 35, "concave type" should read --concave-type--.

Column 20:

Line 65, "concave type" should read --concave-type--.

Column 21:

Line 33, "convex type" should read --convex-type--.

Column 22:

Line 41, "convex type" should read --convex-type--.

Column 25:

Line 2, "concave type" should read --concave-type--.

UNITED STATES PATENT AND TRADEMARK OFFICE

CERTIFICATE OF CORRECTION

PATENT NO. : 6,972,850 B2 
APPLICATION NO. : 10/374142
DATED : December 6, 2005
INVENTOR(S) : Masaru Ohtsuka et al.

It is certified that error appears in the above-identified patent and that said Letters Patent is hereby corrected as shown below:

Column 29:

Line 50, “b” should be deleted.

Column 30:

Line 24, “the in” should read --the--.

Signed and Sealed this

Seventeenth Day of October, 2006

JON W. DUDAS
*Director of the United States Patent and Trademark Office*